(12) United States Patent
Fujisawa et al.

(10) Patent No.: US 10,525,405 B2
(45) Date of Patent: Jan. 7, 2020

(54) COMPONENT TRANSFER PROCESSING METHOD AND COMPONENT TRANSFER PROCESSING DEVICE

(71) Applicant: KOBE STEEL, LTD., Kobe-shi (JP)

(72) Inventors: Akitoshi Fujisawa, Kobe (JP); Koji Noishiki, Takasago (JP); Akira Matsuoka, Kobe (JP)

(73) Assignee: KOBE STEEL, LTD., Kobe-shi (JP)

( * ) Notice: Subject to any disclaimer, the term of this patent is extended or adjusted under 35 U.S.C. 154(b) by 302 days.

(21) Appl. No.: 15/329,786

(22) PCT Filed: Jul. 17, 2015

(86) PCT No.: PCT/JP2015/070556
§ 371 (c)(1),
(2) Date: Jan. 27, 2017

(87) PCT Pub. No.: WO2016/017459
PCT Pub. Date: Feb. 4, 2016

(65) Prior Publication Data
US 2017/0209827 A1 Jul. 27, 2017

(30) Foreign Application Priority Data
Jul. 31, 2014 (JP) .................................. 2014-155730

(51) Int. Cl.
*B01D 19/00* (2006.01)
*B01D 53/18* (2006.01)
(Continued)

(52) U.S. Cl.
CPC .......... *B01D 53/18* (2013.01); *B01D 11/0496* (2013.01); *B01D 19/00* (2013.01);
(Continued)

(58) Field of Classification Search
CPC ................ B01D 11/0496; B01D 19/00; B01D 2251/304; B01D 2251/604;
(Continued)

(56) References Cited

U.S. PATENT DOCUMENTS 4,676,806 A * 6/1987 Dean ...................... B01D 53/14
417/32
2008/0058434 A1 3/2008 Tonkovich et al.
(Continued)

FOREIGN PATENT DOCUMENTS

CN 101612510 A 12/2009
CN 101612511 A 12/2009
(Continued)

OTHER PUBLICATIONS

Extended European Search Report dated Jan. 31, 2018 in Patent Application No. 15827837.4, citing references AA-AC therein, 9 pages.
(Continued)

*Primary Examiner* — Cabrena Holecek
(74) *Attorney, Agent, or Firm* — Oblon, McClelland, Maier & Neustadt, L.L.P.

(57) ABSTRACT

A gas transfer processing method includes: transferring gas to an inside or an outside of an absorption liquid within respective processing flow paths while circulating the absorption liquid through the respective processing flow paths; after the gas transferring, separating a mixed fluid including the absorption liquid discharged from outlets of the respective processing flow paths and gas by respective separation headers into the absorption liquid and the gas; and circulating the absorption liquid separated in the separating by returning the separated absorption liquid from the separation headers to inlets of the respective processing flow paths through respective recirculation lines, thus introducing
(Continued)

the absorption liquid to the respective processing flow paths. The process promotes transfer of a target component to an absorption liquid, while enabling execution of a component transfer process by compact equipment.

11 Claims, 10 Drawing Sheets

(51) Int. Cl.
 *B01D 53/14* (2006.01)
 *C01B 32/50* (2017.01)
 *B01D 11/04* (2006.01)

(52) U.S. Cl.
 CPC ........ *B01D 53/14* (2013.01); *B01D 53/1456* (2013.01); *B01D 53/1475* (2013.01); *B01D 53/1487* (2013.01); *C01B 32/50* (2017.08); *B01D 2251/304* (2013.01); *B01D 2251/604* (2013.01); *B01D 2252/204* (2013.01); *B01D 2257/2045* (2013.01); *B01D 2257/306* (2013.01); *B01D 2257/404* (2013.01); *B01D 2257/502* (2013.01); *B01D 2257/504* (2013.01); *Y02C 10/06* (2013.01)

(58) Field of Classification Search
 CPC ...... B01D 2252/204; B01D 2257/2045; B01D 2257/306; B01D 2257/404; B01D 2257/502; B01D 2257/504; B01D 53/14; B01D 53/1456; B01D 53/1475; B01D 53/1487; B01D 53/18; C01B 32/50; Y02C 10/06
 See application file for complete search history.

(56) References Cited

U.S. PATENT DOCUMENTS

| | | |
|---|---|---|
| 2008/0185339 A1 | 8/2008 | Delapierre et al. |
| 2009/0043141 A1 | 2/2009 | Mazanec et al. |
| 2009/0071335 A1 | 3/2009 | Tonkovic et al. |
| 2010/0024645 A1* | 2/2010 | Tonkovich .......... B01D 53/1493 95/154 |
| 2010/0280136 A1 | 11/2010 | Tonkovich et al. |
| 2011/0215040 A1 | 9/2011 | Delapierre et al. |
| 2014/0061131 A1 | 3/2014 | Matsuoka et al. |
| 2014/0186229 A1 | 7/2014 | Tonkovich et al. |
| 2015/0045459 A1 | 2/2015 | Tonkovich et al. |
| 2016/0114282 A1* | 4/2016 | Matsuoka .......... B01D 53/1475 95/179 |
| 2016/0354753 A1 | 12/2016 | Tonkovich et al. |

FOREIGN PATENT DOCUMENTS

| | | |
|---|---|---|
| JP | 49-80980 | 7/1974 |
| JP | 49-80980 U | 8/1974 |
| JP | 2008-296211 A | 12/2008 |
| JP | 2013-27867 A | 2/2013 |
| JP | 2015-13247 A | 1/2015 |
| WO | WO 2009/017832 A1 | 2/2009 |
| WO | 2009/038472 A1 | 3/2009 |
| WO | 2013/037128 A1 | 3/2013 |
| WO | 2015/001989 A1 | 1/2015 |

OTHER PUBLICATIONS

International Search Report dated Oct. 13, 2015 in PCT/JP2015/070556 filed Jul. 17, 2015.
International Preliminary Report of Patentability and Written Opinion dated Feb. 9, 2017 in PCT/JP2015/070556 (with English translation).

* cited by examiner

COMPONENT TRANSFER PROCESSING METHOD AND COMPONENT TRANSFER PROCESSING DEVICE

TECHNICAL FIELD

The present invention relates to a component transfer processing method and a component transfer processing device.

BACKGROUND ART

A gas transfer processing method, such as a gas absorption method or a gas release method, for transferring gas in and out of a liquid is known as a component transfer processing method for transferring a target component to an absorption liquid. The gas absorption method is designed for absorbing gas into a liquid, while the gas release method is designed for releasing gas from a liquid. In recent years, to achieve such a gas absorption or gas release process by means of compact equipment, for example, there is known a technique in which a liquid is allowed to flow through fine flow paths formed in a microchannel device, thereby absorbing or releasing gas into or from the liquid through the flow paths (see, for example, Patent Document 1 listed below).

PRIOR ART DOCUMENT

Patent Document

Patent Document 1: JP 2013-27867 A

DISCLOSURE OF THE INVENTION

Problems to be Solved by the Invention

In both processes mentioned above, the liquid and gas must coexist at a large gas/liquid ratio in many cases. However, in practice, it is difficult to allow for the flow of liquid and gas while the liquid and gas coexist at the large gas/liquid ratio in the fine flow path, i.e. in a very restricted space.

Specifically, in the gas absorption process, when using an absorption liquid with a high absorbing capacity to make the best of its absorbing capacity, it is necessary to form a two-phase flow (e.g., a slug flow or an annular flow) consisting of the absorption liquid and absorbed gas at a large gas/liquid ratio (e.g., of 1000 or more). However, it is difficult to form an adequate two-phase flow at such a large gas/liquid ratio in the fine flow path. Thus, a sufficient amount of gas for the absorption liquid with a high absorbing capacity cannot be absorbed into the liquid within the fine flow path.

In the gas release process, to sufficiently release gas absorbed in the absorption liquid within the flow path, the absorption liquid and gas to be released from the absorption liquid are required to coexist at a very large gas/liquid ratio in the flow path. However, in practice, it is difficult to achieve such coexistence. Consequently, an adequate gas/liquid ratio cannot be attained, which fails to sufficiently decrease the pressure of gas released into the flow path. Thus, the gas absorbed in the absorption liquid cannot be released sufficiently into the fine flow path.

As mentioned above, the absorption liquid and the gas cannot flow through the fine flow path while coexisting at a large gas/liquid ratio therein. For this reason, the transfer of gas to the absorption liquid cannot progress sufficiently.

The above-mentioned problems may occur in a type of absorption process in which a target component is extracted by an extractant corresponding to the absorption liquid to execute an extraction process within the fine flow path, as well as a type of release process in which a target component is released from an extractant having extracted the target component to execute a release process within the fine flow path.

The present invention has been made to solve the problems mentioned above, and it is an object of the present invention to provide a component transfer processing method and a component transfer processing device that can promote the transfer of a target component to an absorption liquid while being capable of executing a component transfer process by means of compact equipment.

Means for Solving the Problems

To achieve the above-mentioned object, a component transfer processing method according to the present invention is a component transfer processing method for transferring a target component to an inside or an outside of an absorption liquid, the component transfer processing method comprising: preparing a processing device, the processing device including a flow-path structure having a plurality of fine flow paths, a separation portion connected to outlets of the plurality of fine flow paths, and a recirculation line connecting the separation portion and inlets of the plurality of fine flow paths to each other; transferring the target component to the inside or outside of the absorption liquid within the respective fine flow paths while flowing the absorption liquid through the respective fine flow paths; after the component transferring step, separating the absorption liquid from a mixed fluid including the absorption liquid and another fluid at the separation portion, the mixed fluid being discharged from the outlets of the respective fine flow paths into the separation portion; and circulating the absorption liquid separated in the separating step by returning the separated absorption liquid from the separation portion to the inlets of the respective fine flow paths through the recirculation line to introduce the absorption liquid to the respective fine flow paths.

In the component transfer processing method, the process for transferring the target component to the inside or outside of the absorption liquid is executed within the respective fine flow paths of the flow-path structure in the component transferring step, thus enabling the component transfer process by the compact flow-path structure. Consequently, the component transfer process can be executed by means of the compact processing device or processing equipment. Further, in the component transfer processing method, the absorption liquid obtained after the component transfer process within the respective fine flow paths is discharged from the respective fine flow paths and then separated by the separation portion in the separating step. Subsequently, the separated absorption liquid is returned to the inlets of the respective fine flow paths and circulated in the circulating step. Thus, the component transfer process for the absorption liquid can be repeatedly executed within the respective fine flow paths to promote the component transfer to the absorption liquid, even though the absorption liquid and the target component are not allowed to flow through the fine flow paths while coexisting at a large gas/liquid ratio.

In the above-mentioned component transfer processing method, the component transferring step may comprise absorbing the target component in the absorption liquid within the respective fine flow paths by flowing the absorption liquid and the target component so as to be in contact with each other, through the respective fine flow paths.

This structure can absorb the target component into the absorption liquid while allowing the absorption liquid to repeatedly flow through the respective fine flow paths in the circulating step. Thus, the absorption of the target component into the absorption liquid can be promoted, even though the adequate two-phase flow cannot be formed within the respective fine flow paths at a large gas/liquid ratio.

In the component transfer processing method, the component transferring step may comprise releasing the target component from the absorption liquid within the respective fine flow paths by flowing the absorption liquid absorbing the target component, through the respective fine flow paths.

This structure can release the target component from the absorption liquid while allowing the absorption liquid to repeatedly flow through the respective fine flow paths in the circulating step. Thus, the release of the target component from the absorption liquid can be promoted, even though the absorption liquid and the target component released from the absorption liquid cannot coexist within the respective fine flow paths at a large gas/liquid ratio, and the pressure of the release component cannot be sufficiently reduced within the fine flow paths.

The above-mentioned component transfer processing method may be provided, wherein the device preparing step comprises preparing the processing device including a first processing unit and a second processing unit, the first processing unit comprising: a first flow-path structure including a plurality of first fine flow paths, the first flow-path structure and the plurality of first fine flow paths corresponding to the flow-path structure and the plurality of fine flow paths, respectively; a first separation portion corresponding to the separation portion; and a first recirculation line corresponding to the recirculation line, the second processing unit comprising: a second flow-path structure including a plurality of second fine flow paths, the second flow-path structure and the plurality of second fine flow paths corresponding to the flow-path structure and the plurality of fine flow paths, respectively; a second separation portion corresponding to the separation portion; and a second recirculation line corresponding to the recirculation line, wherein the component transferring step comprises: a first absorbing-releasing step of absorbing the target component into the absorption liquid within the respective first fine flow paths by flowing the absorption liquid and the target component so as to be in contact with each other, through the respective first fine flow paths, while releasing the target component from the absorption liquid within the respective second fine flow paths by flowing the absorption liquid absorbing the target component, through the respective second fine flow paths; and a second absorbing-releasing step of releasing the target component from the absorption liquid within the respective first fine flow paths by flowing the absorption liquid absorbing the target component, through the respective first fine flow paths, while absorbing the target component into the absorption liquid within the respective second fine flow paths by flowing the absorption liquid and the target component so as to be in contact with each other, through the respective second fine flow paths, wherein the separating step comprises: a first separating step of, after the first absorbing-releasing step, separating the absorption liquid from a mixed fluid including another fluid and the absorption liquid after absorbing the component, the mixed fluid being discharged from the outlets of the respective first fine flow paths into the first separation portion, while separating the absorption liquid from another mixed fluid including the absorption liquid after releasing the target component and said target component released from the absorption liquid, the other mixture fluid being discharged from the outlets of the respective second fine flow paths into the first separation portion; and a second separating step of, after the second absorbing-releasing step, separating the absorption liquid from a mixed fluid including the absorption liquid after releasing the target component and said target component released from the absorption liquid, the mixture fluid being discharged from the outlets of the respective first fine flow paths into the first separation portion, while separating the absorption liquid from another mixed fluid including another fluid and the absorption liquid after absorbing the component, the other mixed fluid being discharged from the outlets of the respective second fine flow paths into the second separation portion, wherein the circulating step comprising: a first circulating step of returning the absorption liquid separated by the first separation portion in the first separating step to the inlets of the respective first fine flow paths through the first recirculation line to introduce the absorption liquid to the respective first fine flow paths, while returning the absorption liquid separated by the second separation portion in the first separating step to the inlets of the respective second fine flow paths through the second recirculation line to introduce the absorption liquid to the respective second fine flow paths; and a second circulating step of returning the absorption liquid separated by the first separation portion in the second separating step to the inlets of the respective first fine flow paths through the first recirculation line to thereby introduce the absorption liquid to the respective first fine flow paths, while returning the absorption liquid separated by the second separation portion in the second separating step to the inlets of the respective second fine flow paths through the second recirculation line to thereby introduce the absorption liquid to the respective second fine flow paths, and wherein a first period for performing the first absorbing-releasing step, the first separating step and the first circulating step, and a second period for performing the second absorbing-releasing step, the second separating step and the second circulating step, are set alternatively, such that: the absorption liquid, absorbing the target component in the first processing unit in the first absorbing-releasing step, the first separating step, and the first circulating step, flows through the respective first fine flow paths to release the target component in the second absorbing-releasing step; the absorption liquid, releasing the target component in the second processing unit in the first absorbing-releasing step, the first separating step, and the first circulating step, flows through the respective second fine flow paths to absorb the target component in the second absorbing-releasing step; the absorption liquid, releasing the target component in the first processing unit in the second absorbing-releasing step, the second separating step, and the second circulating step, flows through the respective first fine flow paths to absorb the target component in the first absorbing-releasing step; and the absorption liquid, absorbing the target component in the second processing unit in the second absorbing-releasing step, the second separating step, and the second circulating step, flows through the respective second fine flow paths to release the target component in the first absorbing-releasing step.

With this structure, the absorption process and the release process of the target component can be executed in parallel by the first processing unit and the second processing unit, thereby improving the process efficiency as the entire absorption and release process. Furthermore, in this structure, the absorption liquid, which has its absorbing capacity reduced due to an increased concentration of the target component absorbed by the absorption process, is then subjected to the release process to decrease the concentration of the target component in the respective processing units, and consequently the absorption liquid recovers its absorbing capacity. The recovered absorption liquid can be then used for the subsequent absorption process again. Because of this, the efficiency of the absorption process can be improved, compared to a case in which an absorption liquid having its absorbing capacity reduced is continuously used in the absorption process.

In the above-mentioned component transfer processing method, preferably, the device preparing step comprises preparing a processing device including a tank provided in the recirculation line, as the processing device, and the circulating step comprises temporarily storing the absorption liquid separated in the separating step in the tank, and then returning the absorption liquid from the tank to the inlets of the respective fine flow paths.

With this structure, the absorption liquid is temporarily stored in the tank, thereby enabling the increase in the amount of retained absorption liquid that circulates through the processing device. This makes an allowance for setting the appropriate amount of circulation of the absorption liquid depending on variations in the composition and pressure of the target component and the like.

In the above-mentioned component transfer processing method, the target component is $CO_2$, and the absorption liquid is any one of liquids including water, an amine-based solvent, an aqueous solution of an amine-based solvent and an ionic liquid.

A component transfer processing device according to the present invention is a component transfer processing device used in a component transfer process for transferring a target component to an inside or an outside of an absorption liquid, the component transfer processing device comprising: a flow-path structure including a plurality of fine flow paths for transferring the target component to the inside or outside of the absorption liquid while flowing the absorption liquid therethrough; a separation portion connected to outlets of the plurality of fine flow paths, the separation portion being adapted to separate the absorption liquid from a mixed fluid including the absorption liquid and another fluid at the separation portion, the mixed fluid being discharged from the outlet to the separation portion; a recirculation line connecting the separation portion and inlets of the plurality of fine flow paths to each other; and a pump provided in the recirculation line and adapted to return the absorption liquid separated by the separation portion to the inlets of the plurality of fine flow paths through the recirculation line to supply the absorption liquid to the respective fine flow paths.

The component transfer processing device obtains the effects of enabling the component transfer process by the compact equipment, while promoting the transfer of the target component for the absorption liquid because of substantially the same reasons as in the above-mentioned component transfer processing method.

The above-mentioned component transfer processing device may further comprise a supply portion for supplying a fluid to be processed, to the respective fine flow paths, the fluid including the target component, wherein each of the fine flow paths includes: a merging portion adapted to merge the absorption liquid with the fluid to be processed supplied from the supply portion; and a processing portion adapted to execute a process for absorbing the target component included in the fluid to be processed, into the absorption liquid, while flowing the absorption liquid and the fluid to be processed merged together by the merging portion, through the processing portion so as be in contact with each other.

With this structure, the absorption liquid and the fluid to be processed are merged together in the merging portion for the respective fine flow paths, while allowing the absorption liquid to repeatedly flow through the respective fine flow paths, so that the target component can be absorbed into the absorption liquid by the processing portion. Thus, the absorption of the target component into the absorption liquid can be promoted, even though the adequate two-phase flow cannot be formed within the processing portions of the respective fine flow paths at a large gas/liquid ratio.

In the above-mentioned component transfer processing device, each of the respective fine flow paths is a processing flow path adapted to execute a process for releasing the target component from the absorption liquid, while flowing the absorption liquid absorbing the target component therethrough.

With this structure, the target component can be released from the absorption liquid within the respective processing flow paths, while allowing the absorption liquid to repeatedly flow through the respective processing flow paths as the fine flow paths. Thus, in the gas release process, the release of the target component from the absorption liquid can be promoted, even though the absorption liquid and the target component released from the absorption liquid cannot coexist within the respective processing flow paths at a large gas/liquid ratio, and the pressure of the release component cannot be sufficiently reduced within the respective processing flow paths.

The above-mentioned component transfer processing device may comprise: a first processing unit comprising: a first flow-path structure including a plurality of first fine flow paths, the first flow-path structure and the plurality of first fine flow paths corresponding to the flow-path structure and the plurality of fine flow paths, respectively; a first separation portion corresponding to the separation portion; a first circulation line corresponding to the recirculation line; and a first pump corresponding to the pump, a second processing unit comprising: a second flow-path structure including a plurality of second fine flow paths, the second flow-path structure and the plurality of second fine flow paths corresponding to the flow-path structure and the plurality of fine flow paths, respectively; a second separation portion corresponding to the separation portion; a second circulation line corresponding to the recirculation line; and a second pump corresponding to the pump, a first fluid-to-be-processed supply line adapted to lead to inlets of the plurality of first fine flow paths, a second fluid-to-be-processed supply line adapted to lead to inlets of the plurality of second fine flow paths, and a switching device adapted to switch between two states, wherein in one state of the two state, the fluid to be processed is supplied to the respective first fine flow paths through the first fluid-to-be-processed supply line while stopping supply of the fluid to be processed to the respective second fine flow paths through the second fluid-to-be-processed supply line, and in another state of the two state, the fluid to be processed is supplied to the respective second fine flow paths through the second fluid-to-be-processed supply line while stopping supply of the fluid to be processed to the respective first fine flow paths through the first fluid-to-be-processed supply line.

This structure can execute the gas absorption process and the gas release process in parallel by the first processing unit and the second processing unit. Thus, the process efficiency of the entire absorption and release process can be improved.

Furthermore, switching between the above-mentioned states by means of the switching device can alternately set, in the respective processing units, the time period during which a fluid to be processed is supplied and the absorption process of the target component from the fluid to be processed into the absorption liquid is executed while circulating the absorption liquid, and the time period during which the supply of the fluid to be processed is stopped and the release process of the target component from the absorption liquid is executed while circulating only the absorption liquid. Thus, the absorption liquid, which has its absorbing capacity reduced due to an increased concentration of the target component absorbed by the absorption process, is then subjected to the release process to decrease the concentration thereof, and consequently the absorption liquid recovers its absorbing capacity. The recovered absorption liquid can be then used for the subsequent absorption process again. Thus, the efficiency of the absorption process can be improved.

Preferably, the above-mentioned component transfer processing device further comprises a tank provided in the recirculation line and between the separation portion and the pump, the tank being adapted to temporarily store the absorption liquid flowing through the recirculation line.

With this structure, the absorption liquid is temporarily stored in the tank, thereby making it possible to increase the amount of retained absorption liquid that circulates through the processing device. This makes an allowance for setting the appropriate amount of circulation of the absorption liquid depending on variations in the composition and pressure of the target component and the like.

Effects of the Invention

As mentioned above, the present invention can promote the transfer of a target component to an absorption liquid, while being capable of executing a component transfer process by compact equipment.

MODE FOR CARRYING OUT THE INVENTION

Embodiments of the present invention will be described below with reference to the accompanying drawings.

Figure 1:
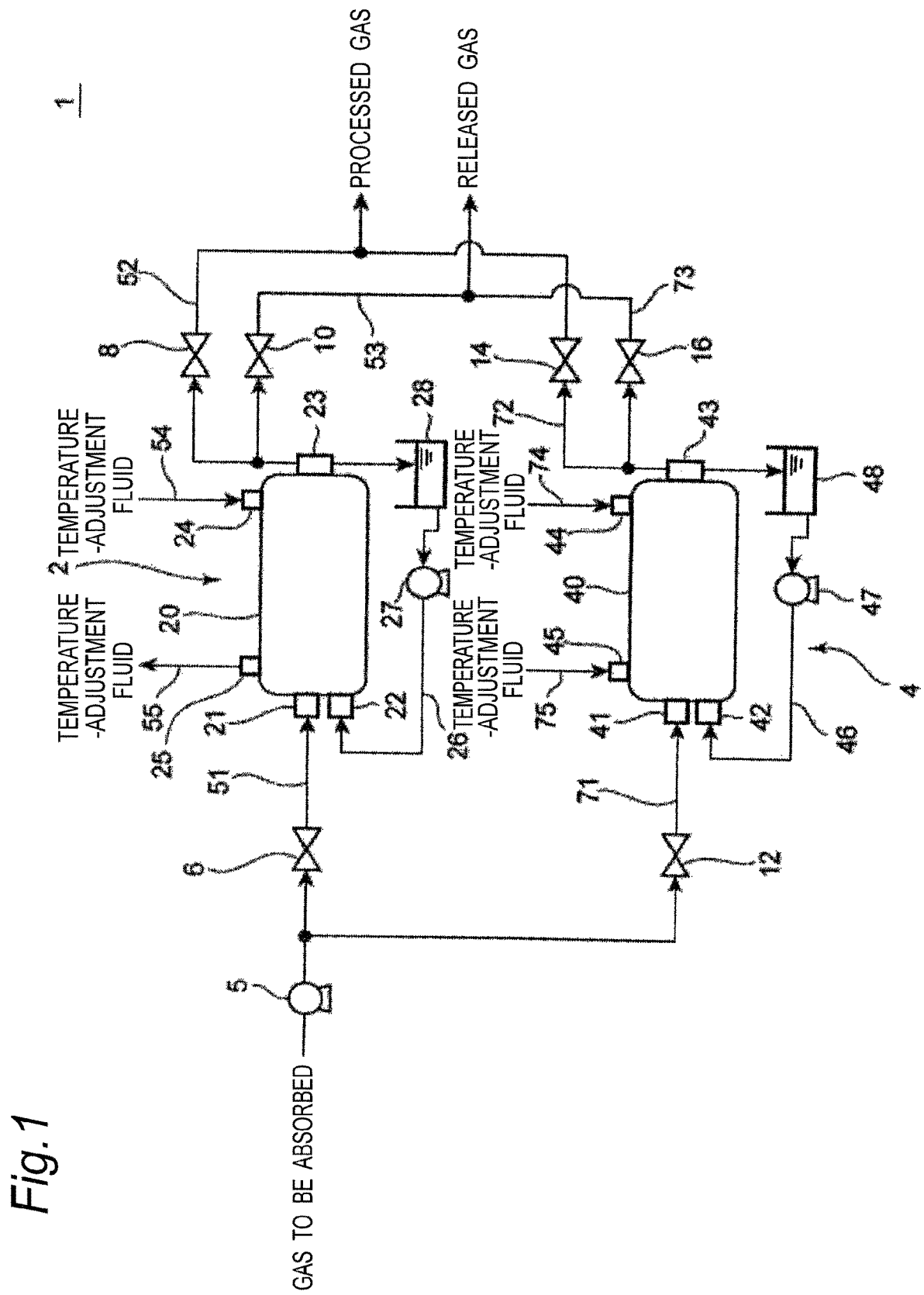
FIG. 1 is an exemplary diagram schematically showing the structure of a gas transfer processing device used in a gas transfer processing method according to one embodiment of the present invention.

A gas transfer processing method according to one embodiment of the present invention is performed using a gas transfer processing device 1 shown in FIG. 1. The gas transfer processing device 1 is one example of a processing device and a component transfer processing device in the present invention. The gas transfer processing device 1 will be hereinafter referred to as the mere "processing device 1". The gas transfer processing method in this embodiment is performed to execute in parallel the transfer of gas from the outside of an absorption liquid into the absorption liquid, i.e. gas absorption into the absorption liquid, and the transfer of gas from the inside of the absorption liquid into the outside of the absorption liquid, i.e. gas release from the absorption liquid.

First, the structure of the processing device 1 used by the gas transfer processing method in this embodiment will be described.

As illustrated in FIG. 1, the processing device 1 includes a first processing unit 2, a second processing unit 4, a gas feeding device 5, a first supply valve 6, a first processed-gas discharge valve 8, a first release-gas discharge valve 10, a second supply valve 12, a second processed-gas discharge valve 14, and a second release-gas discharge valve 16.

Each of the first processing unit 2 and the second processing unit 4 is configured to be capable of executing both a gas absorption process and a gas release process. That is, the respective processing units 2 and 4 are configured to be switched between a state of executing the gas absorption process and a state of executing the gas release process. In the processing device 1, one of the first and second processing units 2 and 4 executes the gas absorption process, while the other executes the gas release process in parallel.

As shown in FIG. 1, the first processing unit 2 includes a first flow-path structure 20, a first gas supply header 21, a first absorption-liquid supply header 22, a first separation header 23, a first temperature-adjustment supply header 24, a first temperature-adjustment discharge header 25, a first recirculation line 26, a first circulation pump 27, and a first tank 28.

The first flow-path structure 20 includes therein a number of first processing flow paths 31 (see FIG. 3) for executing the gas transfer process for the absorption liquid while allowing the absorption liquid to flow therethrough, and a number of first temperature-adjustment flow paths 32 (see FIG. 5) that allow a temperature-adjustment fluid to flow therethrough so as to adjust the temperature of the absorption liquid flowing through the first processing flow path 31 during the gas transfer process. Specific examples of the gas transfer process include the gas absorption process and the gas release process. The first flow-path structure 20 is one example of the flow-path structure in the present invention. The first processing flow paths 31 and the first temperature-adjustment flow paths 32 are fine flow paths (microchannels), each having a fine flow-path diameter. The first processing flow path 31 is one example of the first fine flow path and the fine flow path in the present invention.

Figure 2:
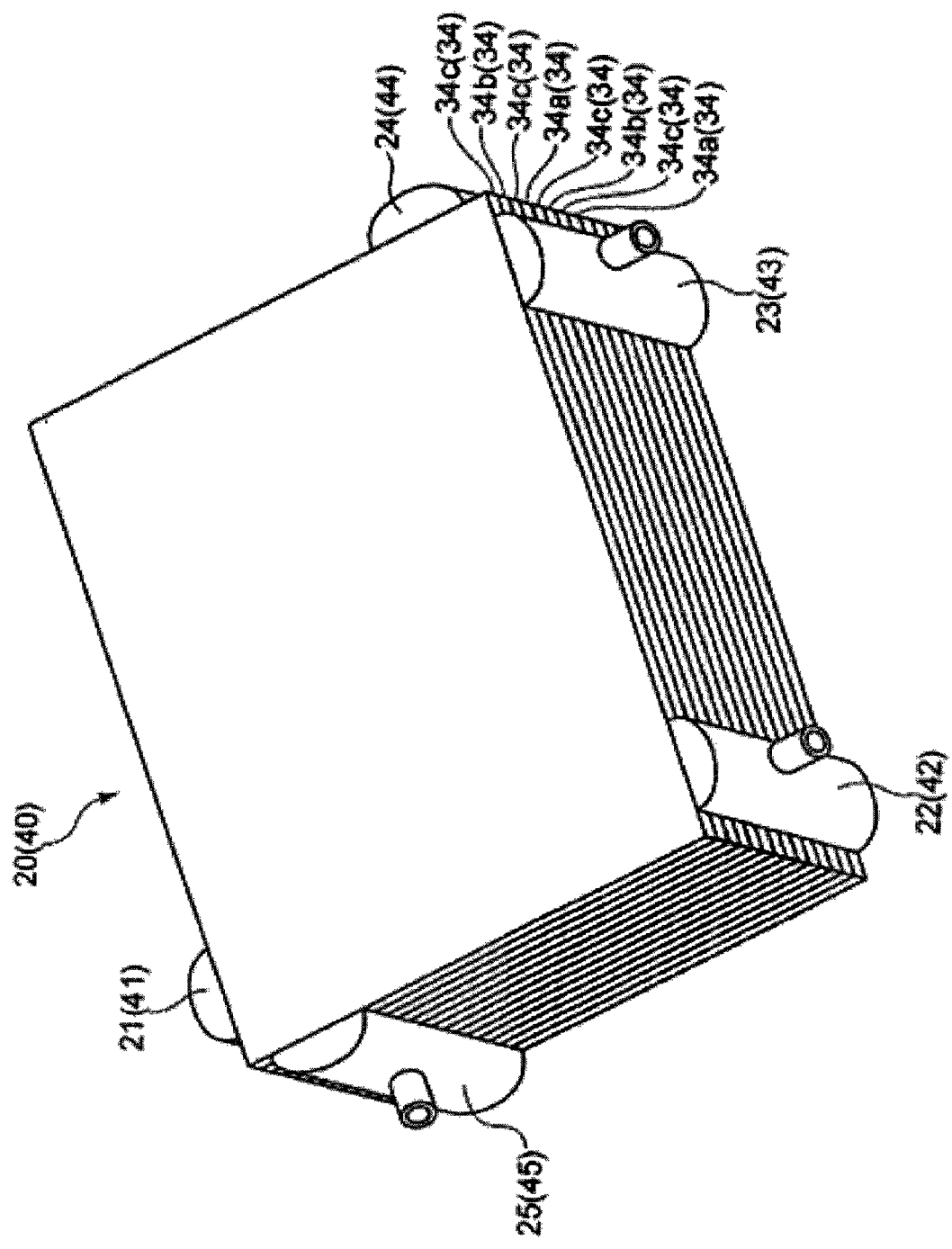
FIG. 2 is a perspective view showing the structure of a first flow-path structure and respective heads attached thereto in a first processing unit, as well as the structure of a second flow-path structure and respective heads attached thereto in a second processing unit.

As shown in FIG. 2, the first flow-path structure 20 is a laminated body configured of a number of substrates 34 that are laminated on each other and bonded together. The substrates 34 includes a plurality of processing flow-path substrates 34a, a plurality of temperature-adjustment substrates 34b, and a plurality of sealing plates 34c. The first flow-path structure 20 is formed by alternately and repeatedly laminating the processing flow-path substrate 34a and the temperature-adjustment substrate 34b with the sealing plate 34c sandwiched therebetween.

Figure 3:
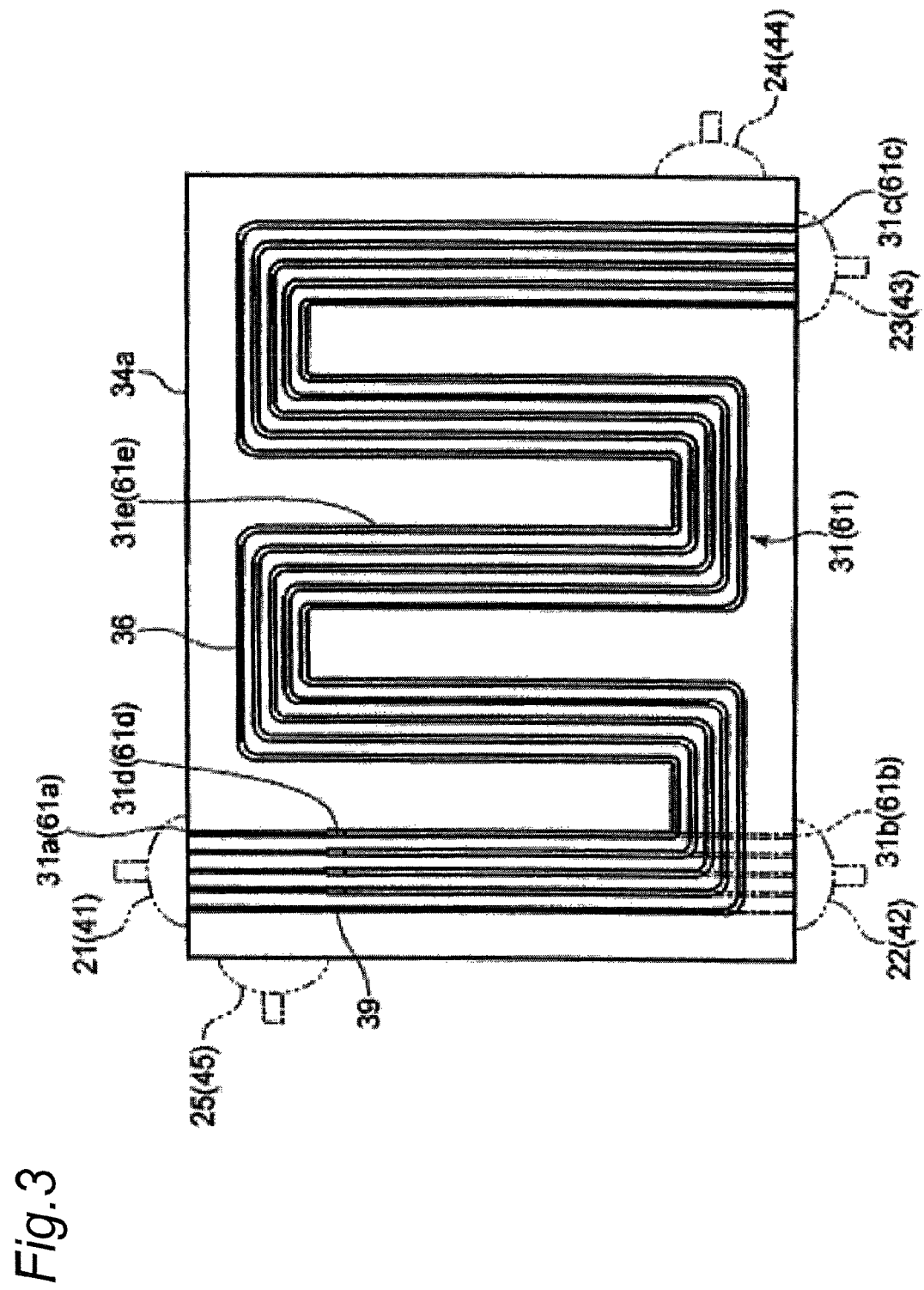
FIG. 3 is a plan view showing one plate surface of a processing flow-path substrate that forms the flow path structure shown in FIG. 2.
Figure 4:
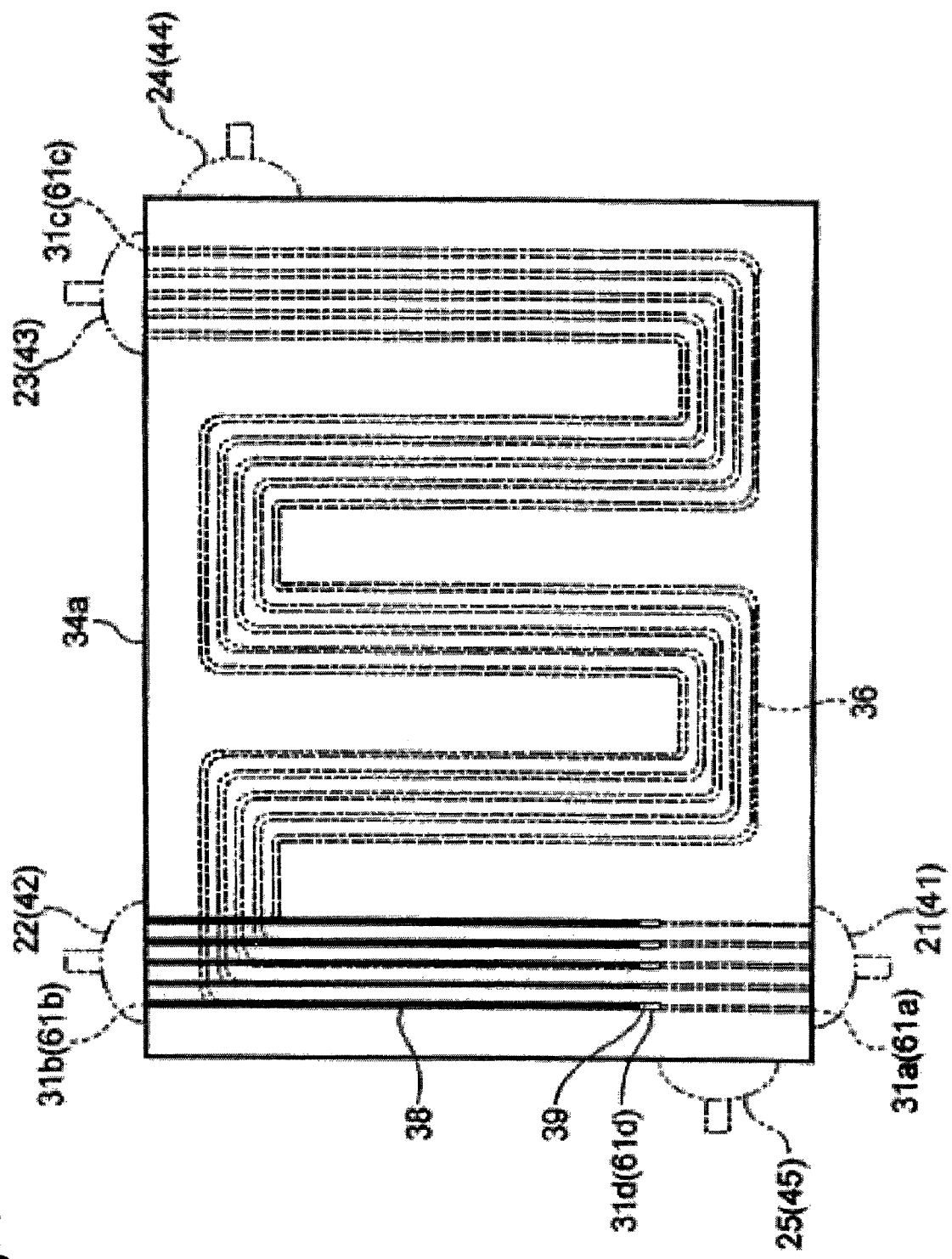
FIG. 4 is a plan view showing the other plate surface of the processing flow-path substrate that forms the flow path structure shown-in FIG. 3.

As shown in FIG. 3, a plurality of grooves 36 is formed on one plate surface of each processing flow-path substrate 34a. As shown in FIG. 4, a plurality of grooves 38 corresponding to the plurality of grooves 36 on one plate surface is formed on the other plate surface of each processing flow-path substrate 34a. At the terminating end of each groove 38, a through hole 39 is provided to penetrate the processing flow-path substrate 34a in the thickness direction thereof so as to lead to the corresponding groove 36 on the one surface side. Openings of the respective grooves 36 formed on one plate surface of each processing flow-path substrate 34a are sealed with the sealing plate 34c (see FIG. 2) laminated on the one plate surface, while openings of the respective grooves 38 formed on the other plate surface of each substrate 34a are sealed with another sealing plate 34c (see FIG. 2) laminated on the other plate surface. In these ways, a plurality of first processing flow paths 31 is formed.

A part of each first processing flow path 31 corresponding to the leading end of the groove 36 is an inlet 31a for gas (see FIG. 3). A part of each first processing flow path 31 corresponding to the leading end of the groove 38 is an inlet 31b for the absorption liquid (see FIG. 4). A part of each first processing flow path 31 corresponding to the terminating end of the groove 36 is an outlet 31c in the first processing flow path 31 (see FIG. 3). A part of each first processing flow path 31 corresponding to the through hole 39 serves as a merging portion 31d that merges the gas and the absorption liquid when executing the gas absorption process. A part of each first processing flow path 31 ranging from the merging portion 31d to the outlet 31c serves as a processing portion 31e that helps to absorb the gas in the absorption liquid while allowing the merged absorption liquid and gas to flow therethrough in contact with each other during the gas absorption process.

When the first processing unit 2 executes the gas release process, a part of each first processing flow path 31 through which the absorption liquid leads from the inlet 31b to the outlet 31c via the merging portion 31d and the processing portion 31e serves as a processing flow path for executing a process for releasing gas from the absorption liquid while allowing the absorption liquid containing the gas to flow therethrough.

Figure 5:
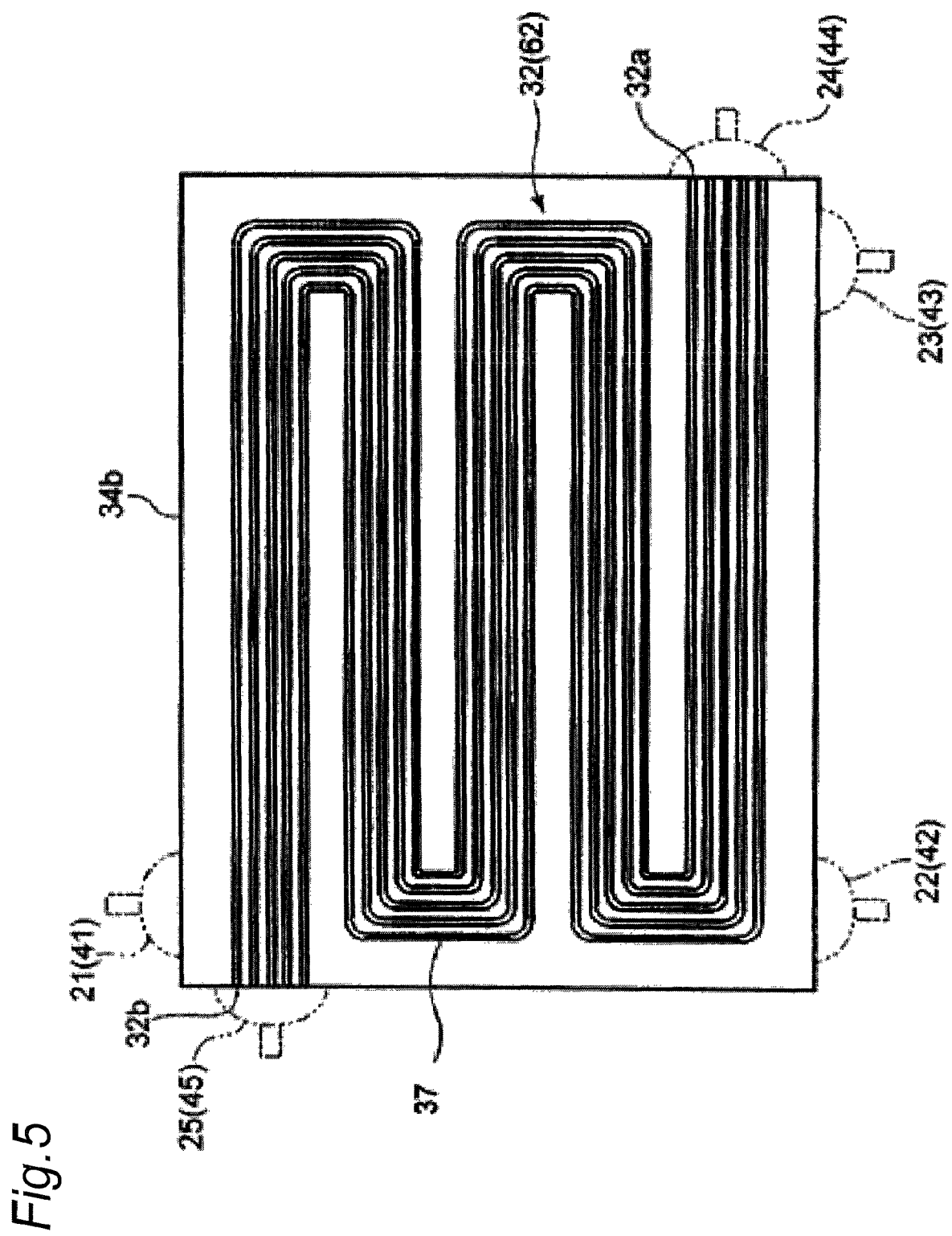
FIG. 5 is a plan view showing a temperature-adjustment substrate that forms the flow-path structure shown in FIG. 3.

As shown in FIG. 5, a plurality of grooves 37 is formed on one plate surface of each temperature-adjustment substrate 34b. Openings of the respective grooves 37 formed on one plate surface of each temperature-adjustment substrate 34b are sealed with the sealing plate 34c laminated on the one plate surface (see FIG. 2), thereby forming a plurality of first temperature-adjustment flow paths 32.

One end of each first temperature-adjustment flow path 32 disposed at one side of the outer edge of the temperature-adjustment substrate 34b is an inlet 32a of the first temperature-adjustment flow path 32. The other end of each first temperature-adjustment flow path 32 opposite to the one end is an outlet 32b of the first temperature-adjustment flow path 32.

The first gas supply header 21 (see FIG. 2) is to distribute and supply gas to the respective first processing flow paths 31 (see FIG. 3). The first gas supply header 21 is attached to the side surface of the first flow-path structure 20 with the inlets 31a for the gas of the first processing flow paths 31 formed thereat to cover all the inlets 31a for gas of the first processing flow paths 31 as a whole.

The first gas supply header 21 is connected to a first gas supply line 51 (see FIG. 1) The first gas supply line 51 is provided with the first supply valve 6. The first gas supply line 51 is connected to the gas feeding device 5 that is used for the absorption process and feeds gas to be absorbed. The gas feeding device 5 is, for example, a compressor or a blower. The opening and closing of the first supply valve 6 switches between a state in which the gas to be absorbed, fed from the gas feeding device 5, is supplied to the first processing flow path 31 through the first gas supply line 51 and the first gas supply header 21, and a state in which the supply of the gas is stopped. Note that the gas to be absorbed is one example of a fluid to be processed in the present invention.

The first absorption-liquid supply header 22 (see FIG. 2) is to distribute and supply the absorption liquid to the respective first processing flow paths 31 (see FIG. 3). The first absorption-liquid supply header 22 is attached to the side surface of the first flow-path structure 20 with the inlets 31b for the absorption liquid of the first processing flow paths 31 formed thereat to cover all the inlets 31b for the absorption liquid of the first processing flow paths 31 as a whole.

In the first separation header 23 (see FIG. 2), a mixed fluid of the absorption liquid and gas obtained after the process is discharged into the header 23 from the outlets 31c (see FIG. 3) of the respective first processing flow paths 31. The first separation header 23 leaves the mixed fluid discharged thereinto to stand there, and thus separates the mixed fluid into gas and liquid phases due to a difference in specific gravity. The first separation header 23 is one example of the separation portion and the first separation portion in the present invention. The first separation header 23 is attached to the side surface of the first flow-path structure 20 with the outlets 31c of the first processing flow paths 31 formed thereat to cover all the outlets 31c of the first processing flow paths 31 as a whole.

The end on the upstream side of the first recirculation line (see FIG. 1) is connected to the lower part of the first separation header 23 for storing herein the absorption liquid, which is obtained by separating the mixed fluid into gas and liquid phases by the first separation header 23. The first recirculation line 26 is one example of the recirculation line in the present invention. The end on the downstream side of the first recirculation line 26 is connected to the first absorption-liquid supply header 22. The first recirculation line 26 guides the absorption liquid separated by the first separation header 23 into the first absorption-liquid supply header 22.

The first recirculation line 26 is provided with the first tank 28 (see FIG. 1) that temporarily stores therein the absorption liquid. The first tank 28 is one example of the tank in the present invention. The first circulation pump 27 is provided in the position of the first recirculation line 26 on the downstream side of the first tank 28. By means of the first circulation pump 27, the absorption liquid is drawn from the first tank 28 and also fed to the first absorption-liquid supply header 22. The absorption liquid is then discharged to the first separation header 23 through the respective first processing flow paths 31 to return from the first separation header 23 to the first tank 28. In these ways, the absorption liquid is allowed to circulate.

As illustrated in FIG. 1, a first processed-gas discharge line 52 and a first release-gas discharge line 53 are connected to an upper part of the first separation header 23 that stores therein the gas obtained by the gas-liquid separation in the first separation header 23. When performing the gas absorption process into the absorption liquid through the first processing flow paths 31, the first processed-gas discharge line 52 discharges the remaining gas introduced into and subjected to the gas-liquid separation by the first separation header 23 after the absorption process, from the first separation header 23. Hereinafter, the remaining gas after the absorption process is referred to as a processed gas. When performing the gas release process from the absorption liquid through the first processing flow paths 31, the first release-gas discharge line 53 discharges the released gas subjected to the gas-liquid separation by the first separation header 23, from the first separation header 23.

The first processed-gas discharge line 52 is provided with the first processed-gas discharge valve 8. The opening and closing of the first processed-gas discharge valve 8 switches between the discharge of the processed gas passing from the first separation header 23 through the first processed-gas discharge line 52 and the stopping of the discharge.

The first release-gas discharge line 53 is provided with the first release-gas discharge valve 10. The opening and closing of the first release-gas discharge valve 10 switches between the discharge of the released gas from the first separation header 23 through the first release-gas discharge line 53 and the stopping of the discharge.

The first temperature-adjustment supply header 24 (see FIG. 2) is to distribute and supply the temperature-adjustment fluid to the respective first temperature-adjustment flow paths 32 (see FIG. 5). The first temperature-adjustment supply header 24 is attached to the side surface of the first flow-path structure 20 with the inlets 32a of the first temperature-adjustment flow paths 32 formed thereat to cover all the inlets 32a of the first temperature-adjustment flow paths 32 as a whole. The first temperature-adjustment supply header 24 is connected to a first temperature-adjustment supply line 54 (see FIG. 1). The temperature-adjustment fluid is supplied through the first temperature-adjustment supply line 54.

In the first temperature-adjustment discharge header 25 (see FIG. 2), the temperature-adjustment fluid is discharged thereinto from the outlets 32b (see FIG. 5) of the respective first temperature-adjustment flow paths 32. The first temperature-adjustment discharge header 25 is attached to the side surface of the first flow-path structure 20 with the outlets 32b of the first temperature-adjustment flow paths 32 formed thereat to cover all the outlets 32b of the first temperature-adjustment flow paths 32 as a whole. The first temperature-adjustment discharge header 25 is connected to a first temperature-adjustment discharge line 55 (see FIG. 1). The temperature-adjustment fluid is discharged from the first temperature-adjustment discharge header 25 through the first temperature-adjustment discharge line 55.

The second processing unit 4 (see FIG. 1) has substantially the same structure as the first processing unit 2. As shown in FIG. 1, the second processing unit 4 includes a second flow-path structure 40, a second gas supply header 41, a second absorption-liquid supply header 42, a second separation header 43, a second temperature-adjustment supply header 44, a second temperature-adjustment discharge header 45, a second recirculation line 46, a second circulation pump 47, and a second tank 48. The structures of the second flow-path structure 40, the second gas supply header 41, the second absorption-liquid supply header 42, the second separation header 43, the second temperature-adjustment supply header 44, the second temperature-adjustment discharge header 45, the second recirculation line 46, the second circulation pump 47, and the second tank 48 correspond to those of the first flow-path structure 20, the first gas supply header 21, the first absorption-liquid supply header 22, the first separation header 23, the first temperature-adjustment supply header 24, the first temperature-adjustment discharge header 25, the first recirculation line 26, the first circulation pump 27, and the first tank 28, respectively. Note that the second flow-path structure 40 is one example of the flow-path structure in the present invention. The second separation header 43 is one example of the separation portion and the second separation portion in the present invention. The second recirculation line 46 is one example of the recirculation line in the present invention. The second tank 48 is one example of the tank in the present invention.

The internal structure of the second flow-path structure 40 is substantially the same as that of the first flow-path structure 20. That is, the second flow-path structure 40 includes therein a number of second processing f low paths 61, like the first processing flow paths 31 (see FIG. 3), and a number of second temperature-adjustment flow paths 62, like the first temperature-adjustment flow paths 32 (see FIG. 5). The second processing flow path 61 is one example of the fine flow path and the second fine flow path in the present invention.

Each of the second processing flow paths 61 includes an inlet 61a for gas, an inlet 61b and an outlet 61c for the absorption liquid, a merging portion 61d, and a processing portion 61e that are formed in the same way as the inlet 31a for gas, the inlet 31b and outlet 31c for the absorption liquid, the merging portion 31d, and the processing portion 31e in the first processing flow path 31.

The second gas supply header 41 is connected to a second gas supply line 71 (see FIG. 1). The second gas supply line 71 is provided with the second supply valve 12. The second gas supply line 71 is substantially the same as the first gas supply line 51. The second supply valve 12 is substantially the same as the first supply valve 6. The second gas supply line 71 is connected to the gas feeding device 5.

The opening and closing of the second supply valve 12 switches between a state in which the gas to be absorbed, fed from the gas feeding device 5, is supplied to the second processing flow path 61 through the second gas supply line 71 and the second gas supply header 41, and a state in which the supply of the gas is stopped. The second supply valve 12 and the first supply valve 6 configure one example of a switching device in the present invention.

As illustrated in FIG. 1, a second processed-gas discharge line 72 and a second release-gas discharge line 73 are connected to a part (upper part) of the second separation header 43 that stores therein the gas, which is obtained by the gas-liquid separation. The second processed-gas discharge line 72 is substantially the same as the first processed-gas discharge line 52, and the second release-gas discharge line 73 is substantially the same as the first release-gas discharge line 53. The second processed-gas discharge line 72 is provided with the second processed-gas discharge valve 14, which is substantially the same as the first processed-gas discharge valve 8. The second release-gas discharge line 73 is provided with the second release-gas discharge valve 16, which is substantially the same as the first release-gas discharge valve 10.

A second temperature-adjustment supply line 74, which is substantially the same as the first temperature-adjustment supply line 54, is connected to the second temperature-adjustment supply header 44. A second temperature-adjustment discharge line 75, which is substantially the same as the first temperature-adjustment discharge line 55, is connected to the second temperature-adjustment discharge header 45.

Next, the gas transfer processing method according to this embodiment will be described.

In the gas transfer processing method of this embodiment, one of the first processing unit 2 and the second processing unit 4 executes the gas absorption process into the absorption liquid, while the other processing unit executes the gas release process from the absorption liquid in parallel. Then, such processes performed by both processing units 2 and 4 are alternately switched at predetermined time periods.

The gas to be absorbed, used for the gas absorption process, is a mixed gas that contains $CO_2$ as a specific component to be absorbed. That is, $CO_2$ is the component to be subjected to the absorption process. The absorption liquid in use has the property that absorbs only $CO_2$ from the gas to be absorbed. Specifically, the absorption liquid in use is any one of water, an amine-based solvent, an aqueous solution of an amine-based solvent, and an ionic liquid. The gas release process uses any one of the above-mentioned liquids that have absorbed $CO_2$ as the absorption liquid to be processed. Furthermore, the gas release process releases $CO_2$ gas as the released gas from the absorption liquid. The gas transfer processing method in this embodiment will be specifically described below.

First, suppose the first processing unit 2 (see FIG. 1) executes the gas absorption process, while the second processing unit 4 executes the gas release process. In this case, the first supply valve 6 is in an opened state, while the second supply valve 12 is in a closed state. Thus, the gas to be absorbed is introduced into the respective first processing flow paths 31 within the first flow-path structure 20 (see FIG. 3) through the first gas supply line 51 and the first gas supply header 21, while the gas to be absorbed is not introduced into the respective second processing flow paths 61 within the second flow-path structure 40. In this case, the first processed-gas discharge valve 8 (see FIG. 1) is in an opened state, while the first release-gas discharge valve 10 is in a closed state. Furthermore, the second processed-gas discharge valve 14 is in a closed state, while the second release-gas discharge valve 16 is in an opened state.

The first tank 28 stores absorption liquid, which is unused in the absorption process. The first circulation pump 27 draws the absorption liquid from the first tank 28 to feed it to the first absorption-liquid supply header 22. The absorption liquid fed to the first absorption-liquid supply header 22 is introduced into the respective first processing flow paths 31 (see FIG. 3) within the first flow-path structure 20. The absorption liquid introduced into each of the first processing flow paths 31 is merged with the mixed gas in the corresponding merging portion 31d, and then flows through the processing portion 31e toward the downstream side in contact with the mixed gas. For example, the absorption liquid and the mixed gas flow through the processing portion 31e toward the downstream side in a two-phase state, such as a slug flow or an annular flow. During a step of allowing the absorption liquid and the mixed gas to flow through the processing portion 31e of each first processing flow path 31, $CO_2$ gas in the gas to be absorbed is absorbed into the absorption liquid.

Since the absorption of $CO_2$ gas into the absorption liquid is a heat generation reaction, the absorption liquid has its temperature increased with heat generated by the gas absorption in each of the first processing flow paths 31. The low-temperature temperature-adjustment fluid used as the refrigerant is introduced into each of the first temperature-adjustment flow paths 32 (see FIG. 5) within the first flow-path structure 20 through the first temperature-adjustment supply header 24 (see FIG. 1), and has its heat removed therefrom during a process in which it flows through each first temperature-adjustment flow path 32. Thus, the temperature increase of the absorption liquid flowing through the processing portion 31e in each of the first processing flow paths 31 (see FIG. 3) is suppressed.

The absorption liquid that absorbs $CO_2$ gas within each of the first processing flow paths 31 as well as the processed gas from which $CO_2$ gas is taken by and absorbed into the absorption liquid are discharged from the outlet 31c of each first processing flow path 31 into the first separation header 23. The mixed fluid composed of the absorption liquid and the processed gas, which has been discharged into the first separation header 23, is allowed to stand in the first separation header 23 to some extent and separated into gas and liquid phases due to a difference in specific gravity.

The processed gas separated by the first separation header 23 is discharged from the first separation header 23 through the first processed-gas discharge line 52 as the first processed-gas discharge valve 8 (see FIG. 1) is in an opened state and the first release-gas discharge valve 10 is in a closed state.

The absorption liquid separated in the first separation header 23 is discharged into the first recirculation line 26 and introduced into the first tank 28. The absorption liquid introduced into the first tank 28 is temporarily stored in the first tank 28 and then fed by the first circulation pump 27 to the first absorption-liquid supply header 22 through the first recirculation line 26. Thus, the absorption liquid is supplied again to each of the first processing flow paths 31 (see FIG. 3).

As mentioned above, the absorption liquid absorbs gas while flowing through the insides of the respective first processing flow paths 31, and circulates from the respective first processing flow paths 31 through the first separation header 23, the first recirculation line 26, and the first absorption-liquid supply header 22. The repetition of this circulation promotes the absorption of gas into the absorption liquid through the respective first processing flow paths 31, resulting in an increased concentration of $CO_2$ as the target component in the absorption liquid.

On the other hand, in the second processing unit 4 (see FIG. 1), the absorption liquid having a high concentration of $CO_2$ as the target component is stored in the second tank 48. The second circulation pump 47 draws the absorption liquid from the second tank 48 to feed it to the second absorption-liquid supply header 42. The absorption liquid fed to the second absorption-liquid supply header 42 is introduced into the respective second processing flow paths 61 (see FIG. 3) within the second flow-path structure 40. The absorption liquid introduced into the respective second processing flow paths 61 releases $CO_2$ gas while flowing towards the downstream side through the flow paths.

The release of $CO_2$ gas from the absorption liquid is a heat absorption reaction. Because of this, the high-temperature temperature-adjustment fluid used as a heat medium is introduced into each of the second temperature-adjustment flow paths 62 (see FIG. 5) within the second flow-path structure 40 through the second temperature-adjustment supply header 44 (see FIG. 1). Then, this temperature-adjustment fluid supplies the reaction heat for the gas release to promote the gas release within the respective second processing flow paths 61 during a process in which it flows through the respective second temperature-adjustment flow paths 62.

The absorption liquid having released $CO_2$ gas within the respective second processing flow paths 61 (see FIG. 3) as well as the $CO_2$ gas released from the absorption liquid are discharged from the outlets 61c of the respective second processing flow paths 61 into the second separation header 43. The $CO_2$ gas released from the absorption liquid is hereinafter referred to as a "released gas" in some cases. The mixed fluid composed of the absorption liquid and the $CO_2$ gas released, which has been discharged into the second separation header 43, is allowed to stand in the second separation header 43 to some extent and separated into gas and liquid phases due to a difference in specific gravity.

The released gas separated by the second separation header 43 is discharged from the second separation header 43 through the second release-gas discharge line 73 as the second processed-gas discharge valve 14 (see FIG. 1) is in a closed state and the second release-gas discharge valve 16 is in an opened state.

The absorption liquid separated in the second separation header 43 is discharged into the second recirculation line 46 and introduced into the second tank 48. The absorption liquid introduced into the second tank 48 is temporarily stored in the second tank 48 and then fed by the second circulation pump 47 to the second absorption-liquid supply header 42 through the second recirculation line 46. Thus, the absorption liquid is supplied again to each of the second processing flow paths 61.

As mentioned above, the absorption liquid releases gas while flowing through the insides of the respective second processing flow paths 61, and circulates from the respective second processing flow paths 61 through the second separation header 43, the second recirculation line 46, and the second absorption-liquid supply header 42. The repetition of this circulation promotes the release of gas from the absorption liquid within the respective second processing flow paths 61, resulting in a decreased concentration of $CO_2$ as the target component in the absorption liquid.

In the way mentioned above, the first processing unit 2 executes the gas absorption process, while the second processing unit 4 executes the gas release process. After this state continues for a predetermined time, these processes executed by the processing units 2 and 4 are alternately switched.

Specifically, the first supply valve 6 (see FIG. 1) is switched to the closed state, while the second supply valve 12 is switched to the opened state. Furthermore, the first processed-gas discharge valve 8 is switched to the closed state, while the first release-gas discharge valve 10 is switched to the opened state. Moreover, the second processed-gas discharge valve 14 is switched to the opened state, while the second release-gas discharge valve 16 is switched to the closed state.

In this way, the gas to be absorbed is not supplied to the first processing unit 2, while the gas to be absorbed is supplied to the second processing unit 4. Consequently, in the first processing unit 2, the absorption liquid that absorbs $CO_2$ and is stored in the first tank 28 is allowed to circulate therethrough, and executes substantially the same gas release process as the above-mentioned gas release process executed in the second processing unit 4. On the other hand, in the second processing unit 4, the absorption liquid stored in the second tank 48 and having a $CO_2$ concentration therein decreased is allowed to circulate therethrough, and executes substantially the same gas absorption process as the above-mentioned gas absorption process executed in the first processing unit 2. As a result of the gas release process executed by the first processing unit 2, the released gas obtained by the gas-liquid separation in the first separation header 23 is discharged from the first processing unit through the first release-gas discharge line 53. As a result of the gas absorption process executed by the second processing unit 4, the processed gas obtained by the gas-liquid separation in the second separation header 43 is discharged from the second processing unit through the second processed-gas discharge line 72.

The predetermined time that serves as a reference timing of switching the executed processes between the first and second processing units 2 and 4 is set, for example, as a time during which the target absorption component comes to remain in the processed gas and the concentration of such a target absorption component in the processed gas reaches 10% of $CO_2$ concentration in the gas to be absorbed, supplied from each of the gas supply lines 51 and 71 to the corresponding processing unit.

Figure 6:
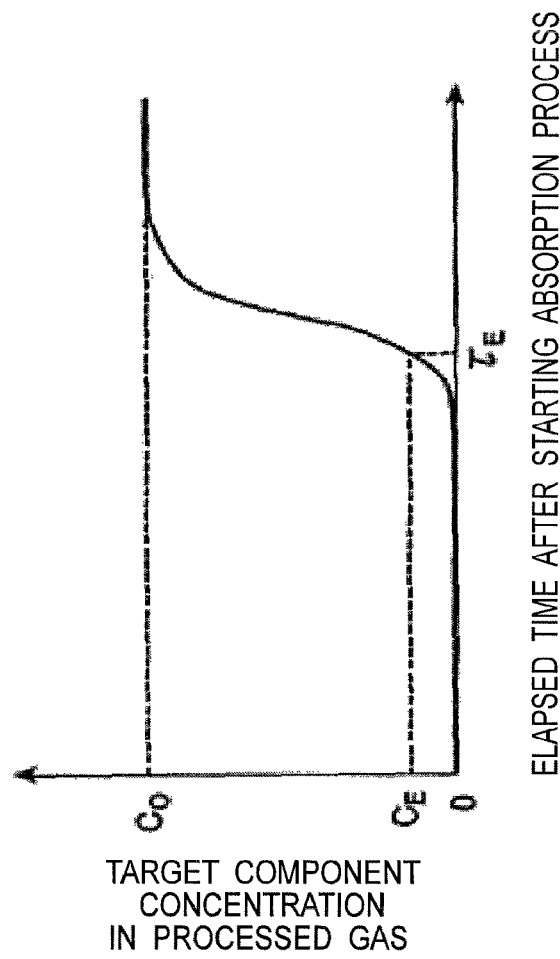
FIG. 6 is a diagram showing changes over time in the concentration of a target component in processed gas subjected to a gas absorption process.

Specifically, as shown in FIG. 6, the concentration of the target component in the processed gas changes over time. As can be seen from FIG. 6, the concentration of the target component in the processed gas is substantially zero (0) until some time elapses after starting the gas absorption process. That is, until this time, the concentration of the target component in the absorption liquid does not become high, so that the absorption liquid holds its absorbing capacity high. Thus, almost the entire amount of target component in the gas to be absorbed and supplied to the processing unit is absorbed into the absorption liquid through the absorption process until this time. After such a time has elapsed, the absorbing capacity of the absorption liquid is reduced with an increasing concentration of the target component in the absorption liquid. Consequently, the target component remains in the processed gas. If the absorption process continues as it is, eventually, the absorption liquid will never absorb the target component. As a result, the concentration of the target component remaining in the processed gas becomes equal to a concentration $C_o$ of the target component in the gas to be absorbed and supplied to the processing unit.

An elapsed time $\tau_E$ is previously derived by experiments or simulation, provided the elapsed time $\tau_E$ indicating a time that is required for the concentration of the target component in the processed gas to reach a concentration $C_E$ corresponding to 10% of the concentration $C_o$ of the target component in the gas to be absorbed. The processes performed by both the processing units 2 and 4 are alternately switched every elapsed time $\tau_E$. Consequently, the absorption liquid in which the concentration of the target component is increased by the gas absorption process is then recovered to a state in which the target component is released by the subsequent gas release process to enhance its absorbing capacity, followed by undergoing the gas absorption process again. This phenomenon repeatedly occurs.

The gas transfer processing method according to this embodiment is performed as mentioned above.

This embodiment executes the gas absorption process and the gas release process in the respective processing flow paths 31 and 61 of the flow-path structures 20 and 40. Because of this, these processes can be performed by the compact flow-path structures 20 and 40. Consequently, these processes can be executed by the compact processing device 1. Additionally, within the respective processing flow paths 31 and 61, a contact area per unit volume between the absorption liquid and gas becomes large, which can enhance the process efficiency of the gas absorption.

Furthermore, in this embodiment, the absorption liquid obtained after the gas absorption process or gas release process within the respective processing flow paths 31 or 61 is discharged from the respective processing flow paths 31 or 61 and then separated into gas and liquid phases at the corresponding separation header 23 or 43 in the separating step. The separated absorption liquid is returned to the inlet 31b or 61b of the corresponding processing flow path 31 or 61 in a circulating step.

In the gas absorption process, when using an absorption liquid with a high absorbing capacity to make the best of its absorbing capacity, it is necessary to form a two-phase flow consisting of the absorption liquid and the gas to be absorbed at a large gas/liquid ratio, for example, of 1000 or more. Examples of the two-phase flow include a slug flow and an annular flow. However, it is difficult to form an adequate two-phase flow while allowing the absorption liquid and the gas to be absorbed to coexist at such a large gas/liquid ratio in a very restricted space, like the fine flow path. Thus, a sufficient amount of gas for the absorption liquid with a high absorbing capacity cannot be absorbed only by the gas absorption process that involves causing the absorption liquid to flow once through the fine flow paths.

In the gas release process, to sufficiently release the target component absorbed in the absorption liquid therefrom within the fine flow path, the absorption liquid and the gas to be released from the absorption liquid are required to coexist at a very large gas/liquid ratio in the fine flow paths. However, the space in the fine flow path is so restricted that the coexistence of the absorption liquid and released gas is difficult in practice. Consequently, an adequate gas/liquid ratio cannot be attained, which fails to sufficiently decrease the pressure of gas released into the fine flow paths. Thus, the target component absorbed in the absorption liquid cannot be released sufficiently into the fine flow paths.

As measures against the problems caused by the gas absorption process or gas release process in the fine flow paths as mentioned above, this embodiment repeats the gas absorption process and/or gas release process by allowing the absorption liquid to repeatedly flow through the respective processing flow paths 31 and 61 during the circulation of the absorption liquid in the way mentioned above. Thus, the gas absorption process can promote the gas absorption into the absorption liquid by repeating the gas absorption into the absorption liquid within the respective processing flow paths 31 and 61, even though the adequate two-phase flow cannot be formed within the respective processing flow paths 31 and 61 at a large gas/liquid ratio. Furthermore, the gas release process can also promote the gas release from the absorption liquid by repeating the gas release from the absorption liquid within the processing flow paths 31 and 61, even though the absorption liquid and the gas released from the absorption liquid cannot coexist within the respective processing flow paths 31 and 61 at a large gas/liquid ratio, failing to sufficiently reduce the pressure of the released gas within the processing flow paths 31 and 61.

In this embodiment, the gas absorption process and the gas release process can be executed in parallel by the first processing unit 2 and the second processing unit 4. Thus, the process efficiency can be improved as the entire absorption and release process.

Furthermore, within the respective processing units 2 and 4 in this embodiment, the absorption liquid that has its absorbing capacity reduced due to an increased concentration of gas absorbed therein by the gas absorption process is subjected to the gas release process to decrease the gas concentration, and thereby the absorption liquid recovers its absorbing capacity. The recovered absorption liquid can be then used for the gas absorption process again. Because of this, the gas absorption process efficiency in this embodiment can be improved, compared to a case in which an absorption liquid having its absorbing capacity reduced is continuously used in the gas absorption process.

In this embodiment, the respective tanks 28 and 48 provided in the respective recirculation lines 26 and 46 temporarily store the absorption liquid therein. Thus, the holding amount of the absorption liquid circulating through the respective processing units 2 and 4 can be increased. This makes an allowance for setting the appropriate amount of circulation of the absorption liquid depending on variations in the composition and pressure of the gas and the like.

It should be understood that the embodiment disclosed herein is illustrative only from all aspects and is not restrictive. The scope of the present invention is represented not by the above-mentioned description of the embodiment, but by the accompanied claims, and includes meaning equivalent to the scope of claims and all modifications within the scope thereof.

The processing device may not necessarily include the first processing unit and the second processing unit. For example, in the respective modified examples shown in FIGS. 7 to 10, the processing device 1 may include a single processing unit 76. In these modified examples, in the single processing unit 76, only either of the gas absorption process and the gas release process is executed.

Figure 7:
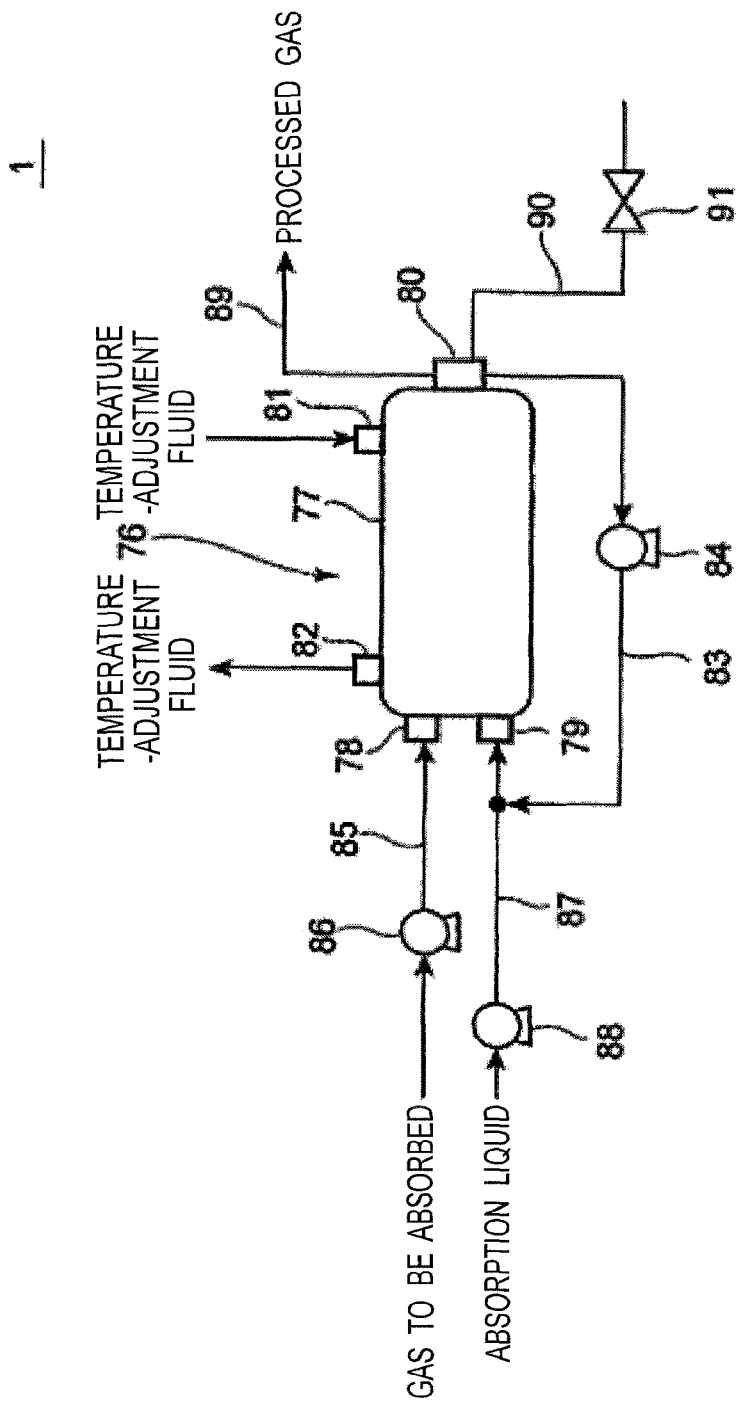
FIG. 7 is an exemplary diagram schematically showing the structure of a processing device for a gas absorption process in a first modified example of the present invention.

The processing device 1 in the first modified example shown in FIG. 7 is configured for the gas absorption process. The processing unit 76 of the processing device 1 in the first modified example includes a flow-path structure 77, a gas supply header 78, an absorption-liquid supply header 79, a separation header 80, a temperature-adjustment supply header 81, a temperature-adjustment discharge header 82, a recirculation line 83, and a circulation pump 84. The structures of the flow-path structure 77, the gas supply header 78, the absorption-liquid supply header 79, the separation header 80, the temperature-adjustment supply header 81, the temperature-adjustment discharge header 82, the recirculation line 83, and the circulation pump 84 correspond to those of the first flow-path structure 20, the first gas supply header 21, the first absorption-liquid supply header 22, the first separation header 23, the first temperature-adjustment supply header 24, the first temperature-adjustment discharge header 25, the first recirculation line 26, and the first circulation pump 27, respectively, in the above-mentioned embodiments. Note that in the processing unit 76, the tank for storing therein the absorption liquid is not provided on the recirculation line 83.

The gas supply header 78 is connected to a gas supply line 85. The gas supply line 85 is connected to a gas feeding device 86. The gas supply line 85 and the gas feeding device 86 are substantially the same as the first gas supply line 51 and the gas feeding device 5 in the above-mentioned embodiment.

The absorption-liquid supply header 79 is connected to an absorption-liquid supply line 87. The absorption-liquid supply line 87 is provided with an absorption-liquid supply pump 88. The absorption-liquid supply pump 88 is a liquid feeding pump. The absorption-liquid supply pump 88 supplies the absorption liquid to the absorption-liquid supply header 79 through the absorption-liquid supply line 87 for a certain period of time after starting the process. Thereafter, the absorption liquid circulates through the processing unit 76 by the circulation pump 84, thereby executing substantially the same gas absorption process as in the above-mentioned embodiment.

The separation header 80 is connected to a processed-gas discharge line 89. The separation header 80 is one example of a separation portion in the present invention. The processed-gas discharge line 89 is substantially the same as the first processed-gas discharge line 52 in the above-mentioned embodiment. An absorption-liquid discharge line 90 for discharging the absorption liquid therefrom is connected to a lower part of the separation header 80. The absorption-liquid discharge line 90 is provided with an absorption-liquid discharge valve 91. The absorption-liquid discharge valve 91 is in a closed state during the gas absorption process. When intended to draw out the absorption liquid from the system of the processing unit 76, the discharge valve 91 is switched to an opened state to discharge the absorption liquid through the absorption-liquid discharge line 90.

Figure 8:
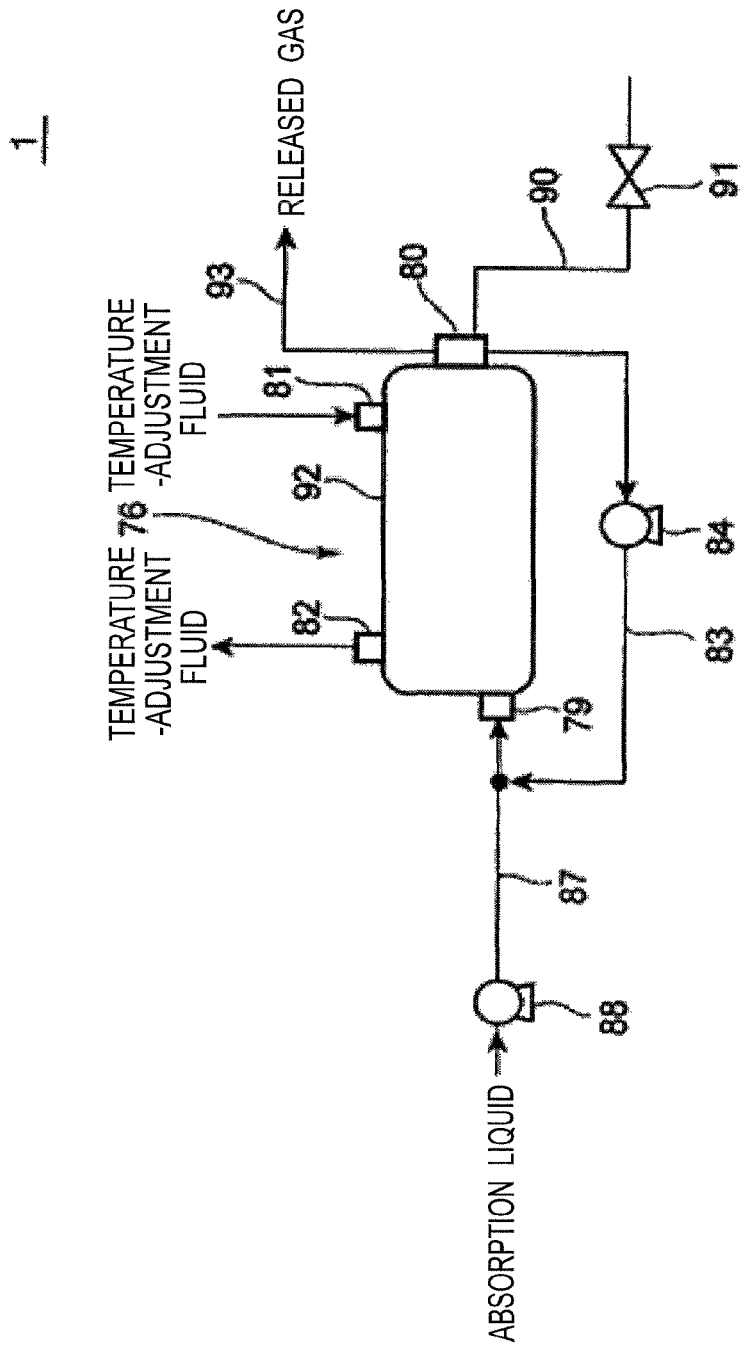
FIG. 8 is an exemplary diagram schematically showing the structure of a processing device for a gas release process in a second modified example of the present invention.

The processing device 1 in a second modified example shown in FIG. 8 is configured for the gas release process. No gas to be absorbed is supplied to the processing unit 76 of the processing device 1 in the second modified example. Thus, a flow-path structure 92 includes therein a number of fine flow paths, as processing flow paths (not shown), each of which neither includes an inlet for the gas to be absorbed, nor an introducing path and a merging portion for the gas to be absorbed. The processing unit 76 in the second modified example does not include any gas supply header. The separation header 80 is connected to a release-gas discharge line 93. The release-gas discharge line 93 is substantially the same as the first release-gas discharge line 53 in the above-mentioned embodiment. The structures of other components in the processing device 1 according to the second modified example are the same as those of the processing device 1 in the first modified example.

In the processing device 1 of the second modified example, the absorption liquid containing the target component is supplied from the absorption-liquid supply pump 88 to the absorption-liquid supply header 79 through the absorption-liquid supply line 87 during a certain period of time after starting the process. Thereafter, the absorption liquid circulates through the processing unit 76 by the circulation pump 84, thereby executing substantially the same gas release process as in the above-mentioned embodiment.

Figure 9:
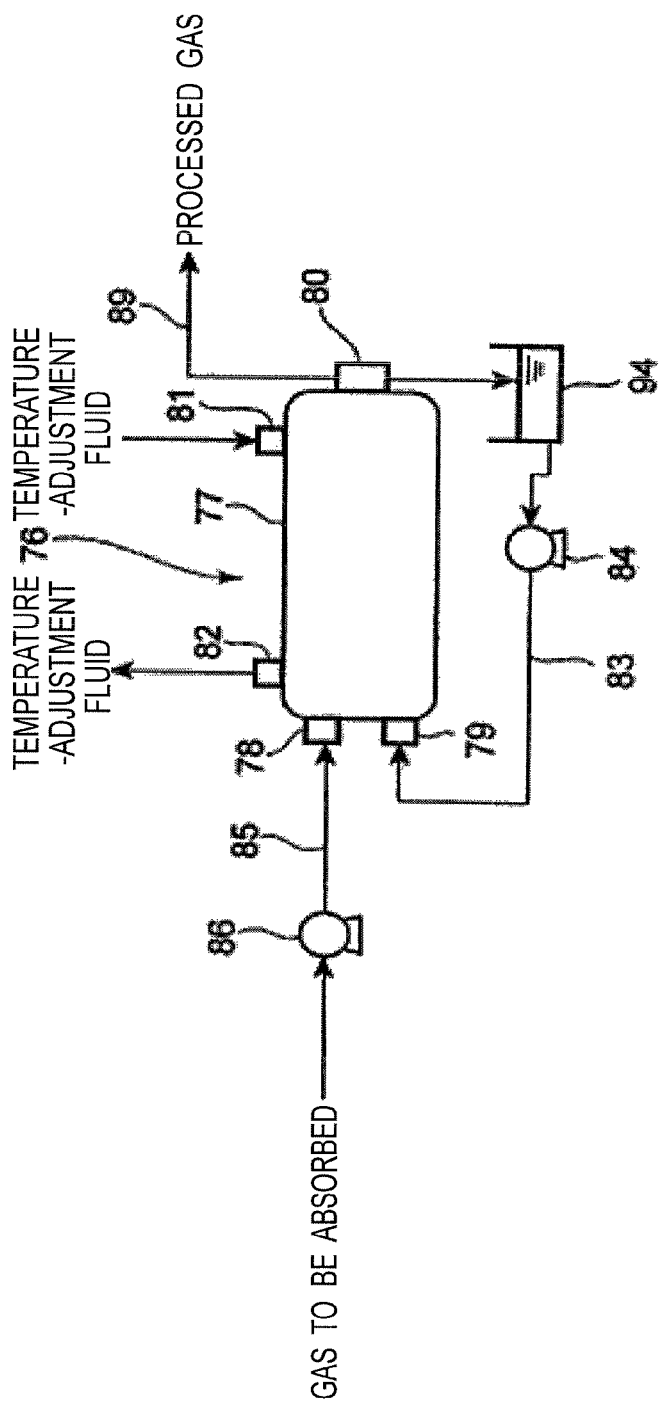
FIG. 9 is an exemplary diagram schematically showing the structure of a processing device for a gas absorption process in a third modified example of the present invention.

The processing device 1 in a third modified example shown in FIG. 9 is configured for the gas absorption process. The processing device 1 in the third modified example corresponds to one configured by omitting the absorption-liquid supply line 87, the absorption-liquid supply pump 88, the absorption-liquid discharge line 90, and the absorption-liquid discharge valve 91 from the configuration of the processing device 1 in the first modified example, and by adding a tank 94 for storing therein the absorption liquid to the recirculation line 83.

In the processing device 1 of the third modified example, the absorption liquid is not fed from the outside. While only the absorption liquid stored in the tank 94 before starting the process is allowed to circulate through the processing unit 76, the substantially same gas absorption process as that in the above-mentioned embodiment is executed.

Figure 10:
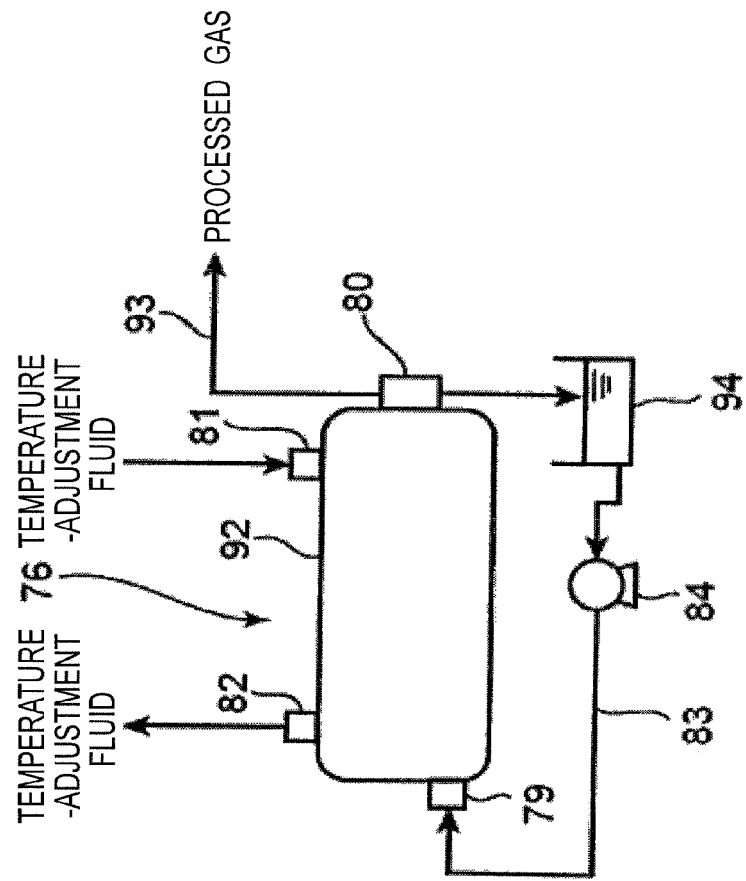
FIG. 10 is an exemplary diagram schematically showing the structure of a processing device for a gas release process in a fourth modified example of the present invention.

A processing device 1 in a fourth modified example shown in FIG. 10 is configured for the gas release process. The processing device 1 in the fourth modified example corresponds to one configured by omitting the absorption-liquid supply line 87, the absorption-liquid supply pump 88, the absorption-liquid discharge line 90, and the absorption-liquid discharge valve 91 from the configuration of the processing device 1 in the second modified example, and by adding the tank 94 for storing therein the absorption liquid to the recirculation line 83.

In the processing device 1 in the fourth modified example, the absorption liquid containing the target component is not fed from the outside, but is previously stored in the tank 94 before starting the process. Then, in the processing device 1 of the fourth modified example, only the absorption liquid stored in the tank 94 is allowed to circulate through the processing unit 76, thereby executing the gas release process in the same way as in the above-mentioned embodiments.

The processing device may include a processing unit dedicated to the gas absorption process and equipped with a tank, and another processing unit dedicated to the gas release process and equipped with a tank. In this case, the processing device may execute the gas absorption process and the gas release process in the following ways.

The processing unit for the gas absorption p the gas absorption process for the predetermined time, while the processing unit for the gas release process executes the gas release process for the same predetermined time. Thereafter, the absorption liquid stored in the tank of the processing unit for the gas absorption process and the absorption liquid stored in the tank of the processing unit for the gas release process are replaced with each other. Subsequently, the processing unit for the gas absorption process restarts the gas absorption process, while the processing unit for the gas release process restarts the gas release process.

With this structure, the absorption liquid having its absorbing capacity reduced due to an increased concentration of the target component through the absorption process by the processing unit for the gas absorption process can be subjected to the release process through the processing unit for the gas release process to decrease the concentration of the target component, and thereby the absorption liquid recovers its absorbing capacity. Then, the absorption liquid having its absorbing capacity recovered can be used to execute the gas absorption process with a high process efficiency again by means of the processing unit for the gas absorption process.

In the above-mentioned embodiment, to replace the processes executed by the respective processing units 2 and 4 at predetermined time periods, the switching between opening and closing of each of the valves 6, 8, 10, 12, 14, and 16 may be manually performed, or otherwise a control device may automatically control the opening and closing of these valves at predetermined time periods.

The gas release process is not necessarily limited to the gas release that is promoted by supplying a reaction heat for releasing the gas from the absorption liquid by the use of a high-temperature temperature-adjustment fluid. For example, by decompressing the inside of each processing flow path to a lower pressure, compared to in the gas absorption process, a method for promoting the gas release from the absorption liquid may be employed. Specifically, a vacuum pump may be provided between the separation portion and the tank in the recirculation line, whereby the vacuum pump may perform decompression to decrease the pressure of the inside of each processing flow path.

The gas to be absorbed, used for the gas absorption process, is not necessarily limited to the mixed gas that contains $CO_2$ as the target component to be absorbed. For example, a mixed gas that contains any component other than $CO_2$ as the target component to be absorbed may be used. Specifically, a mixed gas that contains CO as the target component to be absorbed may be used as the gas to be absorbed. Alternatively, a mixed gas that contains, as the target component to be absorbed, acidic gas, such as $H_2S$, organic sulfur gas, hydrogen chloride gas, or nitrogen dioxide gas, may be used as the gas to be absorbed. Furthermore, a gas containing 100% of the above-mentioned target components to be absorbed may be used as the gas to be absorbed.

To absorb each target component to be absorbed, an absorption liquid suitable for the component may be used. When intended to absorb CO, for example, a solution of a monovalent copper ion may be used as the absorption liquid. Alternatively, to absorb the above acidic gas, a basic solution, such as a sodium hydroxide solution, may be used as the absorption liquid.

The absorption liquid used for the gas release process is not necessarily limited to the absorption liquid that absorbs $CO_2$. For example, an absorption liquid that contains any component other than $CO_2$ as the target component to be released may be used as a target liquid to be subjected to the gas release process. Specifically, an absorption liquid that contains the above-mentioned target component to be absorbed may be one to be subjected to the gas release process.

The component transfer process executed in the present invention is not necessarily limited to the gas absorption process or gas release process.

Examples of the process for transferring a target component from the outside to the inside of the absorption liquid can include, in addition to the gas absorption process, an extraction process for extracting a target component from a fluid to be processed, into an extractant corresponding to the absorption liquid. The invention can also be applied to this extraction process.

One example of the extraction process can be an extraction process of metal ions by alkyl esters of phosphoric acid. This extraction process uses alkyl esters of phosphoric acid as the extractant, and a solution of metal ions as a fluid to be processed. Another example of the extraction process can be an extraction process of metal ions by the formation of a complex compound using a chelating agent. This extraction process uses the chelating agent as the extractant, and a solution of metal ions as a fluid to be processed.

The extraction process can maximize the extracting capacity inherent to the extractant by the effect of accelerating the transfer of components within the processing flow paths, which are the fine flow paths.

Examples of the process for transferring a target component from the inside to the outside of the absorption liquid can include, in addition to the gas release process, a process for releasing a target component from an extractant which has extracted therein the target component. The invention can also be applied to this kind of process.

The present invention includes the following aspects.

First Aspect:

A component transfer processing method for transferring a target component to an inside or an outside of an absorption liquid, comprises:

preparing a processing device, the processing device including a flow-path structure having a plurality of fine flow paths, a separation portion connected to outlets of the plurality of fine flow paths, and a recirculation line connecting the separation portion and inlets of the plurality of fine flow paths to each other;

transferring the target component to the inside or outside of the absorption liquid within the respective fine flow paths while flowing the absorption liquid through the respective fine flow paths;

after the component transferring step, separating the absorption liquid from a mixed fluid including the absorption liquid and another fluid at the separation portion, the mixed fluid being discharged from the outlets of the respective fine flow paths into the separation portion; and circulating the absorption liquid separated in the separating step by returning the separated absorption liquid from the separation portion to the inlets of the respective fine flow paths through the recirculation line to introduce the absorption liquid to the respective fine flow paths.

Second Aspect:

In the component transfer processing method according to the first aspect, the component transferring step comprises absorbing the target component in the absorption liquid within the respective fine flow paths by flowing the absorption liquid and the target component so as to be in contact with each other, through the respective fine flow paths.

Third Aspect:

In the component transfer processing method according to the first aspect, the component transferring step comprises releasing the target component from the absorption liquid within the respective fine flow paths by flowing the absorption liquid absorbing the target component, through the respective fine flow paths.

Fourth Aspect:

In the component transfer processing method according to the first aspect, the device preparing step comprises preparing the processing device including a first processing unit and a second processing unit, the first processing unit comprising: a first flow-path structure including a plurality of first fine flow paths, the first flow-path structure and the plurality of first fine flow paths corresponding to the flow-path structure and the plurality of fine flow paths, respectively; a first separation portion corresponding to the separation portion; and a first recirculation line corresponding to the recirculation line, the second processing unit comprising: a second flow-path structure including a plurality of second fine flow paths, the second flow-path structure and the plurality of second fine flow paths corresponding to the flow-path structure and the plurality of fine flow paths, respectively; a second separation portion corresponding to the separation portion; and a second recirculation line corresponding to the recirculation line, the component transferring step comprises:

a first absorbing-releasing step of absorbing the target component into the absorption liquid within the respective first fine flow paths by flowing the absorption liquid and the target component so as to be in contact with each other, through the respective first fine flow paths, while releasing the target component from the absorption liquid within the respective second fine flow paths by flowing the absorption liquid absorbing the target component, through the respective second fine flow paths; and a second absorbing-releasing step of releasing the target component from the absorption liquid within the respective first fine flow paths by flowing the absorption liquid absorbing the target component, through the respective first fine flow paths, while absorbing the target component into the absorption liquid within the respective second fine flow paths by flowing the absorption liquid and the target component so as to be in contact with each other, through the respective second fine flow paths, wherein the separating step comprises:

a first separating step of, after the first absorbing-releasing step, separating the absorption liquid from a mixed fluid including another fluid and the absorption liquid after absorbing the component, the mixed fluid being discharged from the outlets of the respective first fine flow paths into the first separation portion, while separating the absorption liquid from another mixed fluid including the absorption liquid after releasing the target component and said target component released from the absorption liquid, the other mixture fluid being discharged from the outlets of the respective second fine flow paths into the first separation portion; and a second separating step of, after the second absorbing-releasing step, separating the absorption liquid from a mixed fluid including the absorption liquid after releasing the target component and said target component released from the absorption liquid, the mixture fluid being discharged from the outlets of the respective first fine flow paths into the first separation portion, while separating the absorption liquid from another mixed fluid including another fluid and the absorption liquid after absorbing the component, the other mixed fluid being discharged from the outlets of the respective second fine flow paths into the second separation portion, the circulating step comprising:

a first circulating step of returning the absorption liquid separated by the first separation portion in the first separating step to the inlets of the respective first fine flow paths through the first recirculation line to introduce the absorption liquid to the respective first fine flow paths, while returning the absorption liquid separated by the second separation portion in the first separating step to the inlets of the respective second fine flow paths through the second recirculation line to introduce the absorption liquid to the respective second fine flow paths; and a second circulating step of returning the absorption liquid separated by the first separation portion in the second separating step to the inlets of the respective first fine flow paths through the first recirculation line to thereby introduce the absorption liquid to the respective first fine flow paths, while returning the absorption liquid separated by the second separation portion in the second separating step to the inlets of the respective second fine flow paths through the second recirculation line to thereby introduce the absorption liquid to the respective second fine flow paths, and a first period for performing the first absorbing-releasing step, the first separating step and the first circulating step, and a second period for performing the second absorbing-releasing step, the second separating step and the second circulating step, are set alternatively, such that:

the absorption liquid, absorbing the target component in the first processing unit in the first absorbing-releasing step, the first separating step, and the first circulating step, flows through the respective first fine flow paths to release the target component in the second absorbing-releasing step;

the absorption liquid, releasing the target component in the second processing unit in the first absorbing-releasing step, the first separating step, and the first circulating step, flows through the respective second fine flow paths to absorb the target component in the second absorbing-releasing step;

the absorption liquid, releasing the target component in the first processing unit in the second absorbing-releasing step, the second separating step, and the second circulating step, flows through the respective first fine flow paths to absorb the target component in the first absorbing-releasing step; and the absorption liquid, absorbing the target component in the second processing unit in the second absorbing-releasing step, the second separating step, and the second circulating step, flows through the respective second fine flow paths to release the target component in the first absorbing-releasing step.

Fifth Aspect:

In the component transfer processing method according to any one of the first to fourth aspects, the device preparing step comprises preparing a processing device including a tank provided in the recirculation line, as the processing device, and wherein the circulating step comprises temporarily storing the absorption liquid separated in the separating step in the tank, and then returning the absorption liquid from the tank to the inlets of the respective fine flow paths.

Sixth Aspect:

In the target component transfer processing method according to any one of the first to fifth aspects, the target component is $CO_2$, and the absorption liquid is any one of liquids including water, an amine-based solvent, an aqueous solution of an amine-based solvent and an ionic liquid.

Seventh Aspect:

A component transfer processing device used in a component transfer process for transferring a target component to an inside or an outside of an absorption liquid, comprising:

a flow-path structure including a plurality of fine flow paths for transferring the target component to the inside or outside of the absorption liquid while flowing the absorption liquid therethrough;

a separation portion connected to outlets of the plurality of fine flow paths, the separation portion being adapted to separate the absorption liquid from a mixed fluid including the absorption liquid and another fluid at the separation portion, the mixed fluid being discharged from the outlet to the separation portion;

a recirculation line connecting the separation portion and inlets of the plurality of fine flow paths to each other; and a pump provided in the recirculation line and adapted to return the absorption liquid separated by the separation portion to the inlets of the plurality of fine flow paths through the recirculation line to supply the absorption liquid to the respective fine flow paths.

Eighth Aspect:

The component transfer processing device according to the seventh aspect further comprises a supply portion for supplying a fluid to be processed, to the respective fine flow paths, the fluid including the target component, wherein each of the fine flow paths includes:

a merging portion adapted to merge the absorption liquid with the fluid to be processed supplied from the supply portion; and a processing portion adapted to execute a process for absorbing the target component included in the fluid to be processed, into the absorption liquid, while flowing the absorption liquid and the fluid to be processed merged together by the merging portion, through the processing portion so as be in contact with each other.

Ninth Aspect:

In the component transfer processing device according to the seventh or eighth aspect, each of the respective fine flow paths is a processing flow path adapted to execute a process for releasing the target component from the absorption liquid, while flowing the absorption liquid absorbing the target component therethrough.

Tenth Aspect:

The component transfer processing device according to the seventh or eighth aspect comprises:

a first processing unit comprising:
a first flow-path structure including a plurality of first fine flow paths, the first flow-path structure and the plurality of first fine flow paths corresponding to the flow-path structure and the plurality of fine flow paths, respectively;
a first separation portion corresponding to the separation portion;
a first circulation line corresponding to the recirculation line; and
a first pump corresponding to the pump,
a second processing unit comprising:
a second flow-path structure including a plurality of second fine flow paths, the second flow-path structure and the plurality of second fine flow paths corresponding to the flow-path structure and the plurality of fine flow paths, respectively;
a second separation portion corresponding to the separation portion;
a second circulation line corresponding to the recirculation line; and
a second pump corresponding to the pump,
a first fluid-to-be-processed supply line adapted to lead to inlets of the plurality of first fine flow paths,
a second fluid-to-be-processed supply line adapted to lead to inlets of the plurality of second fine flow paths, and
a switching device adapted to switch between two states, wherein in one state of the two state, the fluid to be processed is supplied to the respective first fine flow paths through the first fluid-to-be-processed supply line while stopping supply of the fluid to be processed to the respective second fine flow paths through the second fluid-to-be-processed supply line, and in another state of the two state, the fluid to be processed is supplied to the respective second fine flow paths through the second fluid-to-be-processed supply line while stopping supply of the fluid to be processed to the respective first fine flow paths through the first fluid-to-be-processed supply line.

Eleventh Aspect:

The component transfer processing device according to any one of the seventh to tenth aspects further comprises a tank provided in the recirculation line and between the separation portion and the pump, the tank being adapted to temporarily store the absorption liquid flowing through the recirculation line.

This application claims priority on Japanese Patent Application No. 2014-155730 filed on Jul. 31, 2014, the disclosure of which is incorporated by reference herein.

DESCRIPTION OF REFERENCE NUMERALS

1 Gas transfer processing device
2 First processing unit
4 Second processing unit
20 First flow-path structure
23 First separation header
26 First recirculation line
28 First tank
31 First processing flow path
31*d* Merging portion
31*e* Processing portion
40 Second flow-path structure
43 Second separation header
46 Second recirculation line
48 Second tank
61 Second processing flow path
77, 92 Flow-path structure
80 Separation header
83 Recirculation line
94 Tank

The invention claimed is:

1. A component transfer processing device used in a component transfer process for transferring a target component to an inside or an outside of an absorption liquid, the component transfer processing device comprising:

a flow-path structure including a plurality of processing flow paths for transferring the target component to the inside or outside of the absorption liquid while flowing the absorption liquid therethrough;

a separation header directly connected to outlets of the plurality of processing flow paths, the separation header being adapted to separate the absorption liquid from a mixed fluid including the absorption liquid and a fluid to be processed at the separation header, the mixed fluid being discharged from the outlets to the separation header;

a recirculation line connecting the separation header and inlets of the plurality of processing flow paths to each other; and a pump provided in the recirculation line and adapted to return the absorption liquid separated by the separation header to the inlets of the plurality of processing flow paths through the recirculation line to supply the absorption liquid to the respective processing flow paths.

2. The component transfer processing device according to claim 1, further comprising a tank provided in the recirculation line and between the separation portion and the pump, the tank being adapted to temporarily store the absorption liquid flowing through the recirculation line.

3. The component transfer processing device according to claim 1, wherein the separation header is attached to a side surface of the flow-path structure.

4. The component transfer processing device according to claim 1, comprising:

a first processing unit comprising:
a first flow-path structure including a plurality of first processing flow paths, the first flow-path structure and the plurality of first processing flow paths corresponding to the flow-path structure and the plurality of processing flow paths, respectively;
a first separation header corresponding to the separation header;
a first circulation line corresponding to the recirculation line; and
a first pump corresponding to the pump,
a second processing unit comprising:
a second flow-path structure including a plurality of second processing flow paths, the second flow-path structure and the plurality of second processing flow paths corresponding to the flow-path structure and the plurality of processing flow paths, respectively;

a second separation header corresponding to the separation header;

a second circulation line corresponding to the recirculation line; and a second pump corresponding to the pump, a first fluid-to-be-processed supply line adapted to lead to inlets of the plurality of first processing flow paths, a second fluid-to-be-processed supply line adapted to lead to inlets of the plurality of second processing flow paths, and a switching device adapted to switch between two states, wherein in one state of the two state, the fluid to be processed is supplied to the respective first processing flow paths through the first fluid-to-be-processed supply line while stopping supply of the fluid to be processed to the respective second processing flow paths through the second fluid-to-be-processed supply line, and in another state of the two state, the fluid to be processed is supplied to the respective second processing flow paths through the second fluid-to-be-processed supply line while stopping supply of the fluid to be processed to the respective first processing flow paths through the first fluid-to-be-processed supply line.

5. The component transfer processing device according to claim 4, further comprising a tank provided in the recirculation line and between the separation header and the pump, the tank being adapted to temporarily store the absorption liquid flowing through the recirculation line.

6. The component transfer processing device according to claim 1, further comprising a supply portion for supplying the fluid to be processed, to the respective processing flow paths, the fluid including the target component, wherein each of the processing flow paths includes:

a merging portion adapted to merge the absorption liquid with the fluid to be processed supplied from the supply portion; and a processing portion adapted to execute a process for absorbing the target component included in the fluid to be processed, into the absorption liquid, while flowing the absorption liquid and the fluid to be processed merged together by the merging portion, through the processing portion so as be in contact with each other.

7. The component transfer processing device according to claim 6, further comprising a tank provided in the recirculation line and between the separation header and the pump, the tank being adapted to temporarily store the absorption liquid flowing through the recirculation line.

8. The component transfer processing device according to claim 6, wherein the separation header is configured to separate the absorption liquid from the mixed fluid, the absorption liquid having an increased concentration of the target component by absorbing the target component at the processing portion of the respective processing flow paths;

the recirculation line connects the separation header and the inlets of the respective processing flow paths to each other to guide the absorption liquid having the increased concentration of the target component and separated by the separation header, into the inlets of the of the respective processing flow paths; and the component transfer processing device is configured to promote absorption of the target component into the absorption liquid to increase a concentration of the target component in the absorption liquid, by repeating; the absorption of the target component into the absorption liquid at the processing portion of the respective processing flow paths; the separation of the absorption liquid at the separation header; and the returning of the absorption liquid separated at the separation header to the inlets of the respective processing flow paths through the recirculation line to introduce the absorption liquid having the increased concentration to the respective flow paths.

9. The component transfer processing device according to claim 1, wherein each of the respective processing flow paths is a processing flow path adapted to execute a process for releasing the target component from the absorption liquid, while flowing the absorption liquid absorbing the target component therethrough.

10. The component transfer processing device according to claim 9, further comprising a tank provided in the recirculation line and between the separation header and the pump, the tank being adapted to temporarily store the absorption liquid flowing through the recirculation line.

11. The component transfer processing device according to claim 9, wherein the separation header is configured to separate the absorption liquid from the mixed fluid, the absorption liquid having a decreased concentration of the target component by releasing the target component at the respective processing flow paths;

the recirculation line connects the separation header and the inlets of the respective processing flow paths to each other to guide the absorption liquid having the decreased concentration of the target component and separated by the separation header into the inlets of the of the respective processing flow paths; and the component transfer processing device is configured to promote release of the target component from the absorption liquid to decrease a concentration of the target component in the absorption liquid, by repeating; the release of the target component from the absorption liquid at the respective processing flow paths; the separation of the absorption liquid at the separation header; and the returning of the absorption liquid separated at the separation header to the inlets of the respective processing flow paths through the recirculation line to introduce the absorption liquid having the decreased concentration to the respective flow paths.

* * * * *